United States Patent [19]
Ogusu et al.

[11] Patent Number: 5,753,809
[45] Date of Patent: May 19, 1998

[54] TIRE PNEUMATIC PRESSURE ESTIMATING APPARATUS

[75] Inventors: Koji Ogusu, Oobu; Naoki Matsumoto, Aichi-gun; Takaharu Idogaki, Okazaki; Shinichi Tamura, Nagoya, all of Japan

[73] Assignee: Nippondenso Co., Ltd., Kariya, Japan

[21] Appl. No.: 691,577

[22] Filed: Aug. 2, 1996

[30] Foreign Application Priority Data

Aug. 4, 1995 [JP] Japan .................................. 7-200050
Sep. 22, 1995 [JP] Japan .................................. 7-244774

[51] Int. Cl.$^6$ .................................................. B60C 23/00
[52] U.S. Cl. ...................... 73/146.2; 340/442; 364/558
[58] Field of Search ...................... 73/146, 146.2, 73/146.5, 146.8; 340/442; 364/558

[56] References Cited

U.S. PATENT DOCUMENTS

| | | | |
|---|---|---|---|
| 5,218,862 | 6/1993 | Hurrell, II et al. | 73/146.5 |
| 5,252,946 | 10/1993 | Walker et al. | 340/444 |
| 5,497,657 | 3/1996 | Taguchi et al. | |
| 5,541,859 | 7/1996 | Inoue et al. | |
| 5,553,491 | 9/1996 | Naito et al. | |
| 5,595,141 | 1/1997 | Udelle et al. | |

FOREIGN PATENT DOCUMENTS

| | | |
|---|---|---|
| 0578826 A1 | 1/1994 | European Pat. Off. |
| 0 69 5653 | 2/1996 | European Pat. Off. |
| 0 699 546 | 3/1996 | European Pat. Off. |
| 0700798 A1 | 3/1996 | European Pat. Off. |
| 44 09 846 | 9/1994 | Germany . |
| 5-133831 | 5/1993 | Japan . |
| 6-328920 | 11/1994 | Japan . |

OTHER PUBLICATIONS

"Method For Measuring Tire Pressure Vibration" Avtomob Transp No. 12, pp. 41–42 (1980).

Mikio Kanai, "Parameter Estimation Rules", Chapter 2.2, Robust Adaptive Control, Sep. 25, 1989, pp. 48–51 (See Specification p. 18).

Tooru Katayama, "Least Squares Method", Chapter 5, Beginning of System Identification, May 25, 1994, pp. 71–73 (See Specification p. 18).

Primary Examiner—George M. Dombroske
Assistant Examiner—Paul D. Amrozowicz
Attorney, Agent, or Firm—Cushman Darby & Cushman IP Group of Pillsbury Madsion & Sutro LLP

[57] ABSTRACT

To provide a tire pressure estimating system which is capable of estimating tire pressure based on a signal representing the rotational speed of a vehicle wheel via a small amount of processing by using low-capacity memory, a wheel speed sensor is provided for each wheel of a vehicle. A pulse signal output by the wheel speed sensor is supplied to a signal processor. In the signal processor, the rotational speed of each vehicle wheel is found from the pulse signal. The signal processor adopts a second-order linear prediction model for the rotational speed of the vehicle wheel and vibration of the tire using parameters identified from values of the rotational speed. A resonance frequency is then found from the identified parameters. Finally, the tire pressure is estimated from a linear relationship between the pressure and the resonance frequency.

64 Claims, 19 Drawing Sheets

TIRE PNEUMATIC PRESSURE ESTIMATING APPARATUS

CROSS-REFERENCE TO RELATED APPLICATIONS

The present application is related to and claims priority from Japanese Patent Application Nos. Hei 7-200050 and Hei 7-244774, incorporated herein by reference.

BACKGROUND OF THE INVENTION

1. Field of the Invention

The present invention relates to a tire pneumatic pressure estimating system for estimating the pneumatic pressure of a vehicle tire or the like. In particular, the present invention relates to a tire pneumatic pressure estimating system for indirectly estimating the pneumatic pressure of vehicle tires from the speed of the vehicle, where the amount of processing that needs to be carried out by the system as well as the memory capacity of the system can be reduced.

2. Description of Related Art

Conventional tire pneumatic pressure (hereinafter "tire pressure") estimating systems are disclosed in Japanese Laid-Open Patent Publication No. Hei 5-133831 and Japanese Laid-Open Patent Publication No. Hei 6-328920. With both of these conventional tire pressure estimating systems, vibration components of the vehicle speed originating in tire vibration are extracted from a signal representing the vehicle speed. Resonance frequencies in the vertical and traveling directions are then found from the vibration components. Finally, the tire pressure is estimated from the resonance frequencies.

By virtue of such a tire pressure estimating system, a device for directly detecting a tire pressure such as a pressure sensor is not required. It is now possible to obtain the tire pressure by means of such a tire pressure estimating system.

In the conventional tire pressure estimating system, however, vibration components of a vehicle wheel rotational speed are extracted by a Fast Fourier Transform (FFT) technique which, in the first place, requires a large amount of arithmetic processing that needs to be carried out by a signal processor and a high-capacity memory, inevitably entailing a high system cost.

Among a plurality of wheels employed in a vehicle, on the other hand, correlation noise such as drive wheel in-phase pitch vibration normally exists. The existence of such noise decreases the accuracy of the estimation of tire pressure based on a signal representing the rotational speed of a vehicle wheel as described above.

SUMMARY OF THE INVENTION

In view of the above-described problems of the prior art, it is an object of the present invention to provide a tire pressure estimating system which is capable of estimating of tire pressure based on a signal representing the rotational speed of a vehicle wheel using a small amount of processing and using a low-capacity memory.

It is another object of the present invention to provide a tire pressure estimating system which is capable of estimating a tire pressure from a signal representing the rotational speed of a vehicle wheel with a higher degree of accuracy by eliminating effects produced by correlation noise existing among a plurality of vehicle wheels.

In order to achieve the objects described above, a tire pressure estimating system according to a first aspect of the present invention includes a wheel speed detector detecting the rotational speed of a vehicle wheel, and a pressure estimating unit estimating the tire pressure of the vehicle wheel by using parameters from a linear prediction model for the wheel rotational speed and vibration of the tire.

In this way, a vibration component of the rotational speed of the vehicle wheel caused by vibration of the tire can be found without using the FFT technique adopted by the conventional tire pressure estimating system. That is, by finding a correlation between signals along the time axis representing the rotational speed of the vehicle wheel, it is possible to estimate parameters of the linear prediction model. The parameters estimated in this way are then used for finding a resonance frequency of the tire in the vertical or drive direction.

More specifically, a tire pressure and the beneath-spring resonance frequency, i.e., the resonance point of vibration of a member beneath the vehicle spring, are related in that the lower the tire pressure, the lower the beneath-spring resonance frequency. On the other hand, the vibration of the member beneath the vehicle spring also affects the rotation of the vehicle wheel. As a result, the vibration of the member beneath the vehicle spring results in a resonance frequency in the rotational speed of the vehicle wheel which is as high as that of the member beneath the spring. That is, the pressure of a vehicle tire and the resonance frequency of the rotational speed of the vehicle tire are related because the lower the tire pressure, the lower the resonance frequency of the rotational speed of the vehicle wheel.

Thus, if the resonance frequency of the rotational speed of the vehicle wheel can be found from the estimated parameters of the linear prediction model, the tire pressure can be found from this relationship. It should be noted that since there are fixed relationships among the parameters of the linear estimation model, the resonance frequency of the rotational speed of the vehicle wheel and the tire pressure as described above, it is also possible to estimate the tire pressure directly from the parameters of the linear estimation model.

In either case, the amount of processing that needs to be carried out and the capacity of the memory required for such processing are much smaller than those of the conventional tire pressure estimating system adopting an FFT technique.

The inventors of the present invention have also discovered that one of the parameters used in the linear prediction model remains essentially unchanged even if the sampling attenuation coefficient is varied. That is, the relationship between this parameter and the resonance frequency is not dependent on the attenuation coefficient of the system. Preferably, the tire pressure estimating system bases its estimation on this parameter for added processing simplicity, accuracy and stability.

Also, it is preferable that the system use a batch least squares method or a recursive least squares method to identify the parameters in the linear estimation model. In this way, the parameters of the linear estimation model can be identified with a high degree of efficiency. Particularly, the model parameters can be identified and the tire pressure estimated from the identified parameters in every sampling operation using the batch least squares method.

It is also preferable that the linear prediction model used be a second-order discrete time model. Since there is only one resonance frequency which is dependent on the pressure for each tire, a second-order linear estimation model is sufficient to identify the model parameters. Since unnecessary calculations associated with higher-order models are not used, processing is further simplified.

The above objects are achieved according to a second aspect of the present invention by providing a tire pressure estimating system having a wheel speed detector detecting the rotational speeds of vehicle wheels, and a pressure estimating unit estimating the pressure of vehicle tires, where the pressures are estimated using parameters from a discrete-time model for vibration of the tires expressed as a linear or non-linear combination of a plurality of any arbitrary rotational speeds detected by the wheel speed detector is used. In this way, a vibration component of the rotational speed of the vehicle wheel caused by vibration of the tire can be found without using the FFT technique adopted by the conventional tire pressure estimating system. Effects of correlation noise among a plurality of vehicle wheels can be eliminated as desired.

More specifically, regardless of the type of noise which may be included in a signal representing the rotational speed of a vehicle wheel, as long as correlation exists between noise components of vehicle wheels, a linear or non-linear combination of signals representing the rotational speeds of the vehicle wheels can be made in accordance with the type of correlation so that the noise components neutralize each other.

In this way, the amount of processing that needs to be carried out and the required memory capacity are much smaller than those of the conventional tire pressure estimating system adopting the FFT technique. Further, effects of correlation noise among a plurality of wheels can be eliminated, allowing the tire pressure to be estimated with an even higher degree of accuracy.

It is preferable that this aspect of the invention utilize a batch least squares or recursive least squares technique for identifying model parameters for reasons similar to those given above.

In the above-described aspects of the present invention, the amount of processing that needs to be carried out and the required memory capacity can be substantially reduced and, in addition, effects of correlation noise among a plurality of vehicle wheels can be eliminated as desired, allowing the tire pressure to be estimated with a high degree of accuracy. The estimation accuracy may decrease depending upon the conditions of the surface of a road on which the vehicle is running.

For example, in the case of a road having a surface with a small amount of roughness such as a snowy road, the road surface input (the input from the surface of the road) decreases, thereby reducing the magnitude of vibration of the tires. As a result, the magnitude of the resonance component included in the rotational speed of the vehicle wheel also decreases. Thus, the signal-to-noise (S/N) ratio encountered in an operation to extract the resonance component from the rotational speed of a vehicle wheel is poor, making it difficult to extract an accurate resonance frequency.

Even an asphalt road may have a bump which causes the input from the surface to increase transiently. Even if the input from the surface increases only transiently, it is difficult to extract an accurate resonance frequency, deteriorating the accuracy in the estimation of the tire pressure. Thus, both of the above aspects of the present invention preferably include a road surface input estimating unit estimating the magnitude of road surface inputs to be supplied to the wheel speed detector. The pressure estimating unit then evaluates reliability of an estimated pressure of the tire based on the magnitude of the road surface inputs estimated by the road surface input estimating unit and discontinues estimation of the tire pressure if a predetermined reliability is not obtained. In this way, the estimation of a tire pressure under the abnormal road surface conditions described above can be excluded by terminating estimation when the magnitude falls below a first threshold value (for snowy roads and the like) or when it rises above a second threshold value (for bumpy roads and the like), thereby allowing high accuracy in the estimation of the tire pressure to be maintained.

Preferably, these threshold values are changed in accordance with the rotational speed of the vehicle wheel detected by the wheel speed detector. In this way, threshold values to be used as criteria in a determination as to whether the estimation of the tire pressure is to be halted can be set more appropriately. As a result, the determination as to whether the estimation of the tire pressure is to be halted can be made more properly, allowing even higher accuracy to be maintained in the estimation of the tire pressure.

It is further preferable that both of these aspects of the present invention include an attenuation coefficient estimating unit estimating the attenuation coefficient of a vibration component to be supplied to the wheel speed detector, and that the pressure estimating unit evaluates reliability of an estimated pressure of the tire from the attenuation coefficient of the vibration component estimated by the attenuation coefficient estimating unit and discontinues estimation of the tire pressure if a predetermined reliability is not obtained. In this way, the estimation of a tire pressure under the above-described abnormal road surface conditions can be excluded, thereby allowing high accuracy to be maintained in the estimation of the tire pressure.

Similar to the above-described road surface input estimating unit, it is preferable that the pressure estimating unit discontinues estimation of the tire pressure if the attenuation coefficient of the vibration component estimated by the attenuation coefficient estimating unit is greater than a first threshold value, that is, if the vibration component of the resonance frequency is extremely small, or if it is smaller than a second threshold value, that is, if the vibration component of the resonance frequency is extremely large.

In this way, the estimation of a tire pressure with a low degree of accuracy caused by, for example, a small amount of road roughness of a snowy road as described above (which might cause the estimated attenuation coefficient to be large) or a or a bump existing on the surface of even an asphalt road as described above (which might cause the estimated attenuation coefficient to be small), can be excluded, again allowing high accuracy to be maintained in the estimation of the tire pressure.

It should be noted that, normally, the attenuation coefficient cited above also changes from time to time depending upon the rotational speed of the vehicle wheels. Thus, again similar to the above-described road surface input estimating unit, it is preferable that the attenuation coefficient threshold values are changed in accordance with the rotational speed of the vehicle wheel detected by the wheel speed detector. In this way, threshold values to be used as criteria in a determination as to whether the estimation of the tire pressure is to be halted can be set more appropriately. As a result, the determination as to whether the estimation of the tire pressure is to be halted can be made more properly, allowing even higher accuracy to be maintained in the estimation of the tire pressure.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1:
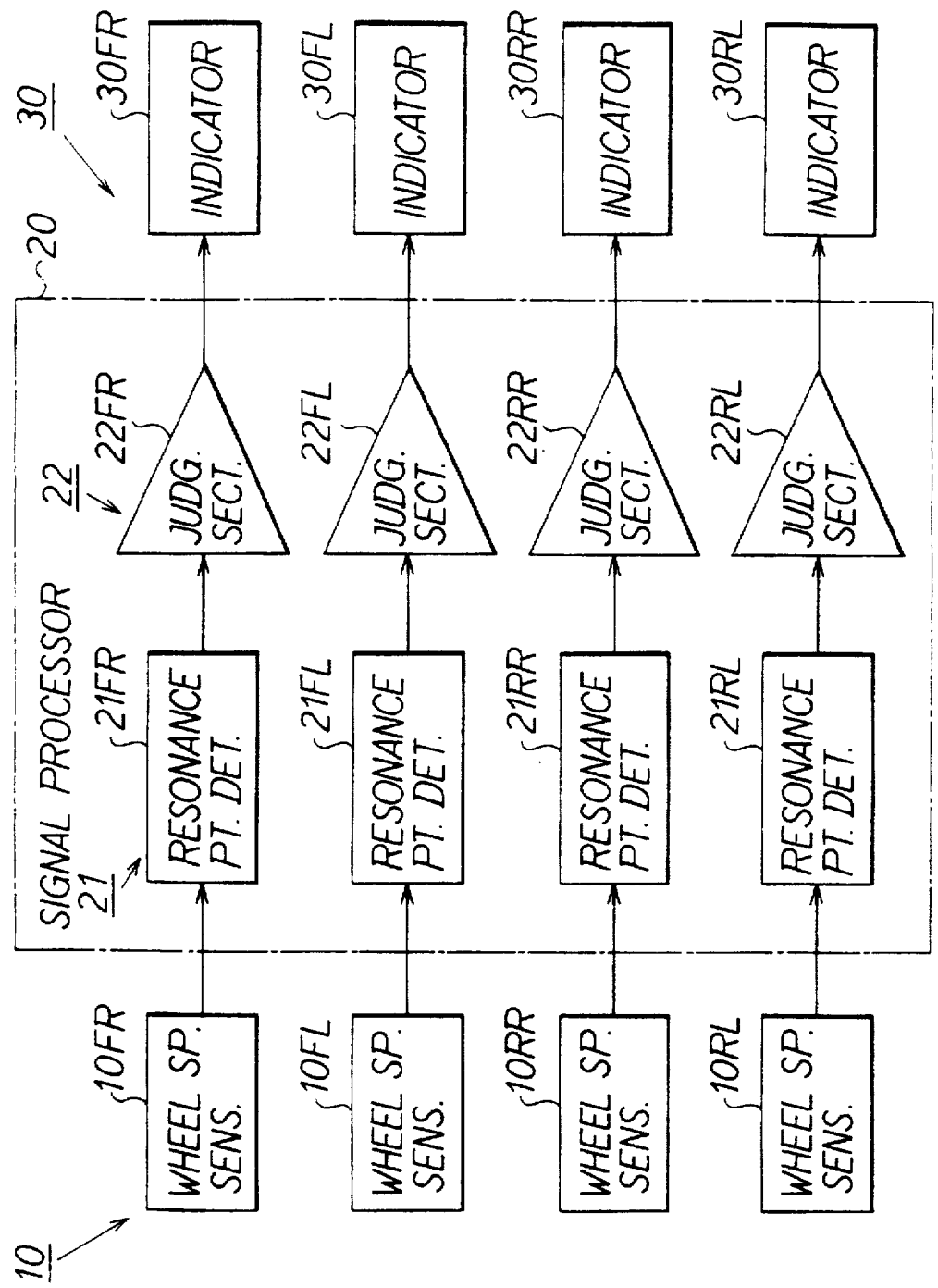
FIG. 1 is a block diagram showing a first embodiment implementing a tire pressure estimating system provided by the present invention.

A tire pressure estimating system according to a first preferred embodiment of the present invention is shown in FIG. 1. In this system, a resonance frequency of the rotational speed of each vehicle wheel is detected, and from the detected resonance frequency ω, the tire pressure estimating system determines whether the actual tire pressure is smaller than a lower permissible limit thereof.

As described previously, tire pressure and beneath-spring resonance frequency (the resonance point of vibration of a member beneath the vehicle spring) are in a relationship where the lower the tire pressure, the lower the beneath-spring resonance frequency.

On the other hand, the vibration of the member beneath the vehicle spring also affects the rotation of the vehicle wheel. As a result, the vibration of the member beneath the vehicle spring results in a resonance frequency in the rotational speed of the vehicle wheel which is as high as that of the member beneath the spring. That is, the vehicle tire pressure and the resonance frequency of the rotational speed of the vehicle tire are related such that the lower the tire pressure, the lower the resonance frequency of the rotational speed of the vehicle wheel.

In the case of the tire pressure estimating system according to the first embodiment, the estimation of tire pressure is based on the relationship between the tire pressure and the resonance frequency of the rotational speed of the vehicle wheel. The tire pressure estimating system then determines whether the estimated tire pressure is smaller than a lower limit thereof, i.e., a minimum of a range of the tire pressure that does not affect the driving of the vehicle.

FIG. 1 shows main components constituting the tire pressure estimating system according to the first embodiment of the present invention including wheel speed sensors 10, a signal processor 20 for carrying out necessary processing on a signal output by the wheel speed sensors 10 and for making a determination described above on a tire pressure derived resulting from the processing, and a display 30 for displaying a result of the determination in a predetermined format.

Figure 2:
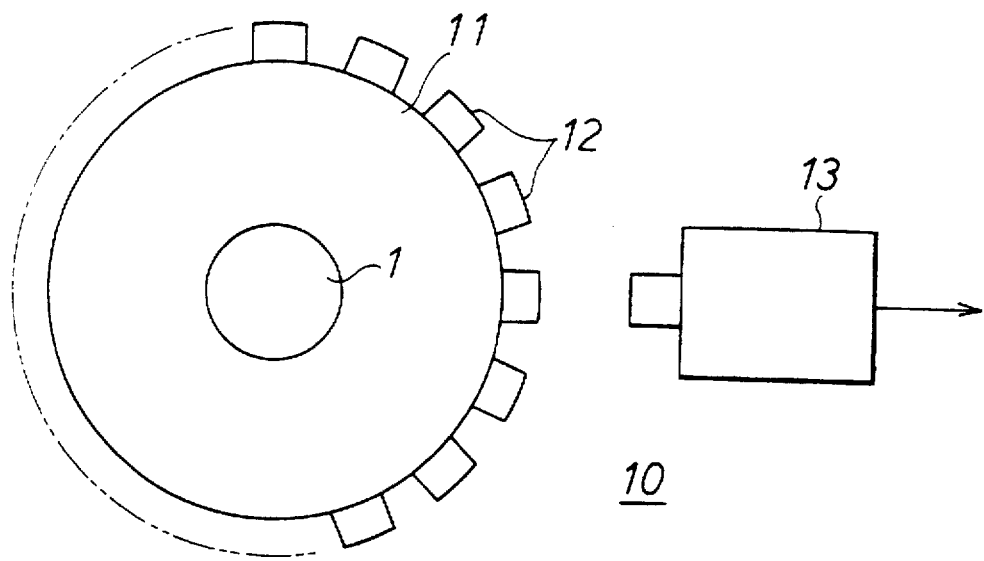
FIG. 2 is a skeleton diagram showing a model configuration of a wheel speed sensor employed in the first embodiment.

Wheel speed sensors 10 are provided for each wheel of the vehicle and are used for detecting the rotational speed of the wheel. Typically, the vehicle has four wheel speed sensors 10FR, 10FL, 10RR and 10RL for the front right, front left, rear right and rear left wheels, respectively. The structure of each of the wheel speed sensors 10FR, 10FL, 10RR and 10RL is shown in FIG. 2.

As shown in the Figure, each wheel speed sensor 10 includes a rotor 11 attached to the vehicle wheel 1 which rotates along with the vehicle wheel 1, teeth 12 provided on the circumference of the rotor 11 at a fixed pitch, and an electromagnetic pickup 13 for electromagnetically detecting the passage of the teeth 12 accompanying the rotation of the rotor 11. The teeth 12 are thus objects of detection in the sensor 10. A fluctuating amplitude signal induced in the electromagnetic pickup 13 is supplied to the signal processor 20 as a wheel speed signal output by the wheel speed sensor 10.

Figure 3:
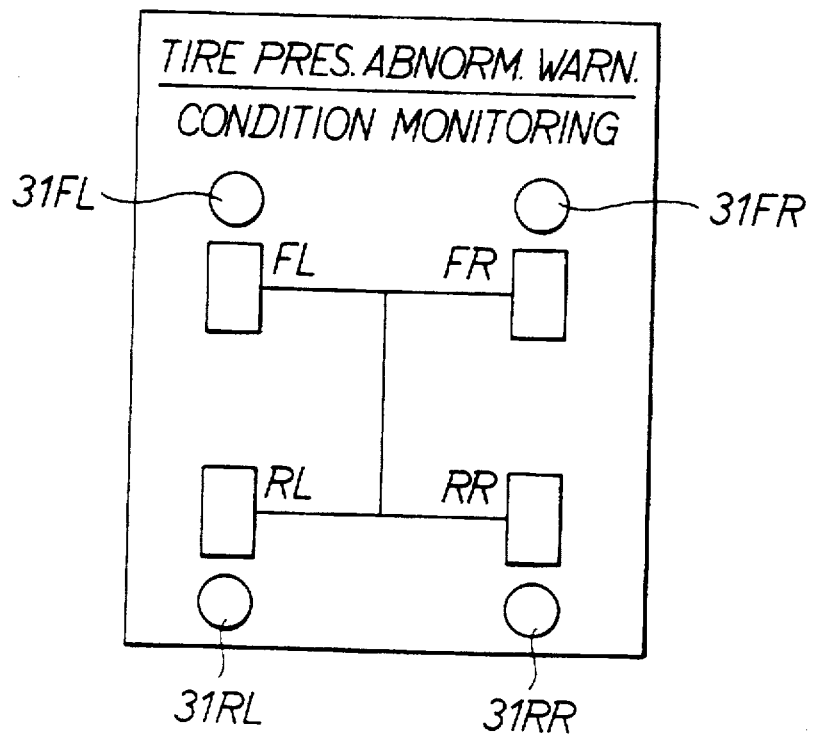
FIG. 3 is a plane diagram showing a skeleton configuration of a display employed in the first configuration.

The display 30 employed in the tire pressure estimating system according to the first embodiment for displaying a result of a determination made by the signal processor 20 regarding the tire pressure is a device for controlling the turning on and turning off operations of each of warning lamps 31 provided on an instrument panel of the vehicle in a typical layout shown in FIG. 3.

As shown in the Figure, the display 30 typically includes sub-displays 30FR, 30FL, 30RR and 30RL and warning lamps 31FR, 31FL, 31RR and 31RL respectively associated with the sub-displays 30FR, 30FL, 30RR and 30RL. When the pressure of the front right vehicle tire is determined to be abnormal, the sub-display 30FR turns on the warning lamp 31FR, and the other lamps are controlled similarly. By controlling the actuation of the warning lamps 31 (31FR, 31FL, 31RR and 31RL, a driver can be informed immediately via signals each having a high degree of visibility of a vehicle tire whose pressure is abnormal.

Receiving a wheel speed signal output by the wheel speed sensor 10 described above, the signal processor 20 determines whether the pressure p of each of the vehicle wheels is abnormal and outputs a signal for driving and controlling the display operation of the display 30. As shown in FIG. 1, the signal processor 20 includes resonance point detectors 21 for detecting the resonance frequency described earlier from the incoming wheel speed sensor and determination units 22 for determining whether an abnormality in the tire pressure exists from the detect ed resonance frequency.

Figure 4:
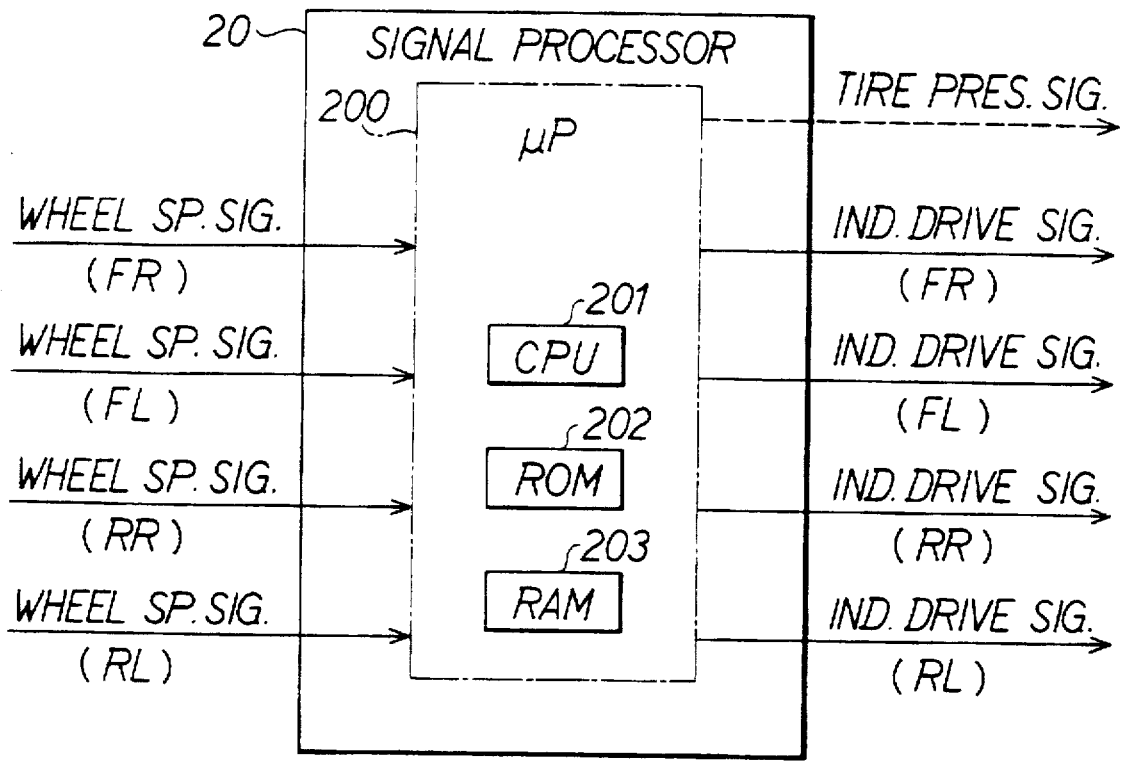
FIG. 4 is a plane diagram showing a skeleton configuration of a signal processor employed in the first configuration.

The signal processor 20 is implemented as a microprocessor 200 as shown in FIG. 4. The microprocessor 200 implements the functions of the resonance point detector 21 and the determination unit 22 as described above. As is generally known, the microprocessor 200 basically includes a ROM 202 used mainly as a program memory and a RAM 203 serving as a data memory in addition to a CPU 201.

Next, signal processing carried out by the signal processor 20 is described in detail as follows. First of all, the basic principle of estimation of a resonance frequency from the wheel speed sensor adopted by the resonance point detector 21 is explained. The resonance point detector 21 comprises resonance frequency detecting sub-units 21FR, 21FL, 21RR and 21RL associated with the front right, front left, rear right and rear left vehicle wheels respectively.

Figure 5:
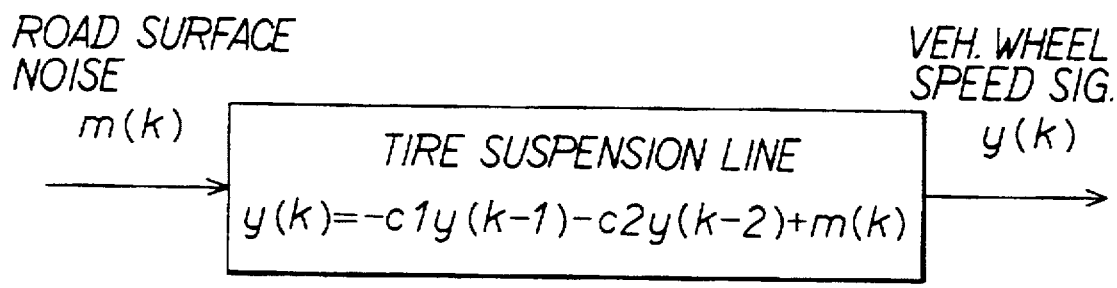
FIG. 5 is a block diagram showing a physics model adopted in estimation of a tire pressure.

A physics model of the estimation of a tire's pressure is shown in FIG. 5. As shown in the Figure, receiving external disturbance m(k), a sort of white noise, from the surface of a road, a tire suspension system outputs a wheel speed signal y(k). The wheel speed signal y(k) includes resonance components which are dependent on the tire pressure.

In the case of the tire pressure estimating system according to the first embodiment of the present invention, the tire suspension system is approximated by a linear prediction model with parameters thereof identified by using a least squares method. Since there is only one resonance point dependent upon the pressure for each tire, use of a second-degree linear prediction model is sufficient. With a second-degree model, the amount of processing that needs to be carried out by the signal processor 20 as well as the required size of the RAM 203 can be minimized.

The parameter k used in the road surface external disturbance m(k) and the wheel speed signal y(k) denotes the number of the sampling operation. In this case, a second-order discrete-time model can be expressed by Equation 11 as follows.

$$y(k) = -c1\, y(k-1) - c2\, y(k-2) + m(k) \quad (11)$$

The purpose of the identification of the parameters is to estimate parameters c1 and c2 by using a limited number of samples of observed data y(k). As noted above, the parameters c1 and c2 are identified by using a least squares technique.

Two component vectors θ and z are respectively defined by Equations 12 and 13. As can be seen in Equations 12 and 13, θ and z are a parameter vector and a measured value vector, respectively.

$$\theta = \begin{pmatrix} -c1 \\ -c2 \end{pmatrix} \quad (12)$$

$$z(k) = \begin{pmatrix} y(k-1) \\ y(k-2) \end{pmatrix} \quad (13)$$

Equations 12 and 13 can be substituted into Equation 11 to yield Equation 14 as follows:

$$y(k) = z^T(k)\theta + m(k) \quad (14)$$

The function m(k) used in Equation 14 is the aforementioned road surface external disturbance which can be regarded as a sort of white noise. Using the least squares technique, the unknown parameters can be identified by minimizing a performance function expressed by Equation 15 as follows.

$$J = \sum_{k=1}^{N} m^2(k) \quad (15)$$

By minimizing the performance function expressed by Equation 15, the parameters in Equation 12 can be identified. By using the batch least squares method, the estimated values of Equation 12 that minimize the performance function expressed by Equation 15 can be expressed by Equation 16. For details, refer to references on the subject such as "Introduction to Robust Adaptive Control" by Kimio Kanai and published by Ohm Corporation, or "Introduction to System Identification," System Control Information Library 9, by Toru Katayama and published by Asakura Company, both of which are hereby incorporated by reference.

$$\theta = \left[ \sum_{k=1}^{N} x(k)z^T(k) \right]^{-1} \sum_{k=1}^{N} z(k)x(k) \quad (16)$$

Next, a resonance frequency ω is found by using the parameters c1 and c2 as follows. Let T denote a sampling period. In this case, relationships between the parameters c1 and c2 of the second-order discrete-time model, the resonance frequency ω and an attenuation coefficient ζ can be expressed by Equations 17 and 18 as follows:

$$c1 = -2e^{2\pi\zeta\omega T}\cos(2\pi\omega \sqrt{1-\zeta^2}\ T) \quad (17)$$

$$c2 = e^{-4\pi\zeta\omega T} \quad (18)$$

Accordingly, Equations (17) and (18) can be rewritten into Equation 19 expressing the resonance frequency ω as a function of c1 and c2 and Equation 20 which express the attenuation coefficient ζ as a function of c2 as follows:

$$\omega = \frac{1}{2\pi T} \sqrt{\left( \frac{\log c2}{2} \right)^2 + \left[ \cos^{-1}\left( -\frac{c1}{2\sqrt{c2}} \right) \right]^2} \quad (19)$$

$$\zeta = -\frac{1}{4\pi\omega T} \log c2 \quad (20)$$

Figure 6:
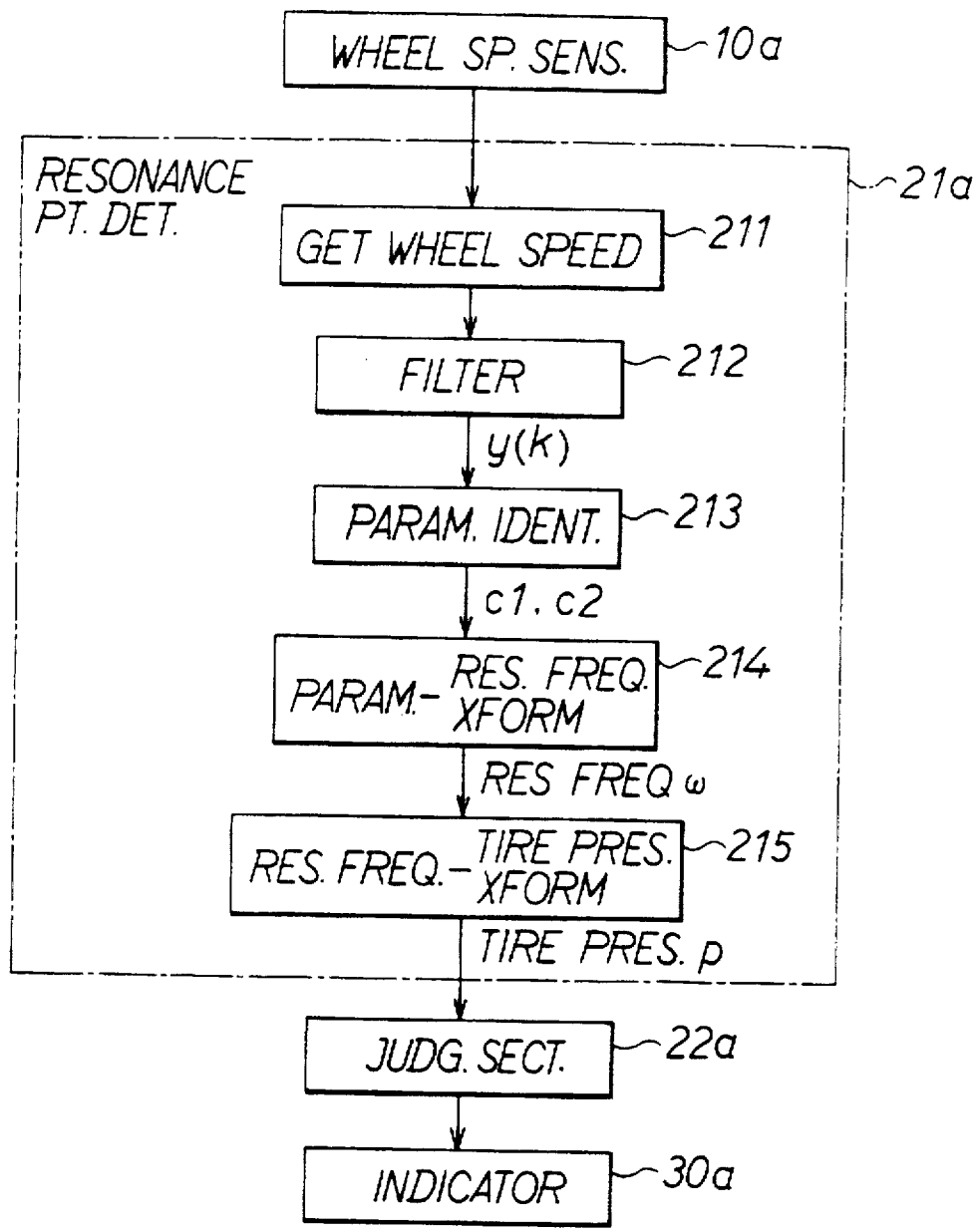
FIG. 6 is a block diagram mainly showing a typical configuration of a resonance point detector employed in the signal processor.

FIG. 6 shows a detailed configuration of the resonance point detector 21 (including the resonance frequency detecting sub-units 21FR, 21FL, 21RR and 21RL as explained above) for estimating the resonance frequency ω in accordance with the principles described above. It should be noted, however, that for the sake of convenience, FIG. 6 illustrates only one of the sub-systems for the vehicle wheels shown in FIG. 1.

In a resonance point detector 21a shown in FIG. 6, a wheel speed processing unit 211 shapes the waveform of a signal output by the wheel speed sensor 10a, converting the analog signal into a digital pulse signal. At this time, the wheel speed processing unit 211 computes an average value of pulse widths in the digital signal for every predetermined sampling period of, typically, 7.8 ms. The wheel speed processing unit 211 then computes the rotational speed of the vehicle wheel from the reciprocal of the average value. In this way, the wheel speed processing unit 211 can output the computed wheel speed signal during every sampling period.

A filter 212 passes only components of the wheel speed signal output by the wheel speed processing unit 211 which have frequencies in a band including the resonance frequency ω. As described earlier, the resonance frequency ω is dependent upon the tire pressure.

The wheel speed signal has a resonance frequency which is equal to that of the member beneath the spring of the vehicle wheel. Actually, the wheel speed signal also includes other resonance components in addition to the component at the resonance frequency ω. In the case of a vehicle, normally a passenger car, in which the first embodiment is implemented, the resonance frequency ω dependent on the pressure of the tire is known to have a value in the range 32 Hz to 40 Hz according to experiments. The filter 212 employed in the tire pressure estimating system according to the embodiment is a fourth-order Butterworth filter which has a passband of 30 Hz to 45 Hz. Signal components passing through the filter 212 are the wheel speed signal $y(k)$ defined by the principles described above.

A parameter identifying unit 213 is used for finding the parameters c1 and c2 of the discrete-time model from the wheel speed signal $y(k)$ output by the filter 212 by using Equation 16. As described above, the parameters c1 and c2 are identified by using the batch least squares method in accordance with a typical procedure shown in FIG. 7.

First of all, at a step S1311 of a parameter identifying routine shown in the Figure, the parameter identifying unit 213 initializes vectors M and V and the number of sampling operations k. Execution then proceeds to a step S1312 to execute processing of the following equation.

$$M=M+z(k)z^T(k)$$
$$V=V+z(k)y(k) \quad (21)$$

Execution then proceeds to a step S1313 to increment k, the number of sampling operations. Subsequently, execution proceeds to a step S1314 to determine whether the number of sampling operations k has reached a predetermined value N. The execution of the processing of Equation 21 at the step S1312 and the incrementing of the number of sampling operations k at the step S1313 are repeated until the number of sampling operations k is determined at the step S1314 to have reached the predetermined value N. It should be noted that, in this example, the predetermine value N is set at 8,000. That is, it takes about 60 seconds (T×N=7.8 ms×8,000) to repeat the steps S1312 to S1314 for all samples before execution exits the loop to continue to a step S1215.

At the step S1315, processing of Equation 16 is carried out. That is, at the time the flow exits from the loop of the steps 1312 to 1313, processing expressed by Equation 22 is carried out by using results obtained from the processing of Equation 21.

$$\theta = M^{-1}V \quad (22)$$

The flow then continues to a step S1316 to output the calculated parameters (or correlation coefficients) c1 and c2.

By repeating the execution of the parameter identifying routine in the parameter identifying unit 213, the parameter identifying unit 213 can output results of the identification, the parameters c1 and c2, about every 60 seconds as described above.

A parameter/resonance frequency converter 214 in the resonance point detecting system 21a shown in FIG. 6 converts the identified parameters c1 and c2 into a resonance frequency ω by executing processing of Equation 19. In addition, a resonance frequency/pressure converter 215 further converts the resonance frequency ω into a pressure p.

Figure 8:
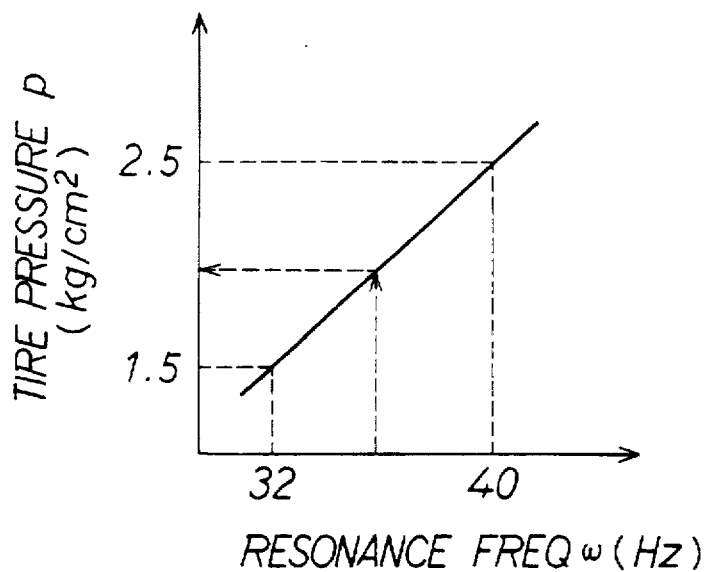
FIG. 8 shows a graph used for converting a resonance frequency ω into a tire pressure.

As described above, the higher the pressure of the tire, the higher the resonance frequency. Conversely, the lower the pressure of the tire, the lower the resonance frequency. For conversion purposes, the resonance frequency/pressure converter 215 has a typical table as shown in FIG. 8. The table contains relationships between the pressure p of a tire and the resonance frequency ω. By using such a table, the value of the pressure can be estimated directly from the resonance frequency.

The resonance point detector 21a (representing the resonance frequency detecting sub-units 21FR, 21FL, 21RR and 21RL) supplies the value of the pressure of the tire to the determination unit 22a (representing the determination sub-units 22FR, 22FL, 22RR and 22RL associated with the resonance frequency detecting sub-units 21FR, 21FL, 21RR and 21RL respectively).

The determination unit 22a determines whether the pressure of the associated tire is abnormal by comparing the tire pressure output by the resonance point detector 21a with a threshold value for determining the abnormality of the pressure. The threshold value has been set in advance as a criterion value in the comparison. If the tire pressure output by the resonance point detector 21a is lower than the criterion value, the driver is notified of the pressure abnormality via the display unit 30a (i.e., via the display sub-unit 30FR, 30FL, 30RR or 30RL).

When a drive signal is supplied from the determination unit 22a to the display unit 30a to notify the driver of the pressure abnormality, the associated lamp 31 shown in FIG. 3 is turned on. The turned-on lamp 31 informs the driver that the tire associated with the lamp 31 has an abnormal pressure.

As described above, according to the tire pressure estimating system of the first embodiment, when the pressure of a tire decreases to an abnormal value due to natural leakage, running over a nail or other causes, the driver is informed of the accident immediately. After air is replenished to the tire indicated by the warning lamp to restore the pressure of the tire to an acceptable value, the determination unit 22a stops transmitting the drive signal to the display unit 30a. As a result, the turned-on warning lamp 31 is turned off.

In the case of the tire pressure estimating system of the first embodiment, the tire suspension system of the vehicle is approximated by a linear prediction model represented by Equation 11. The parameters of the linear prediction model are identified by using a least squares technique. The resonance frequency of the wheel speed signal $y(k)$ which is dependent on the tire pressure is then estimated. As a result, the amount of processing that needs to be carried out and the required memory capacity are smaller than those of the conventional tire pressure estimating system adopting the FFT method.

Figure 9:
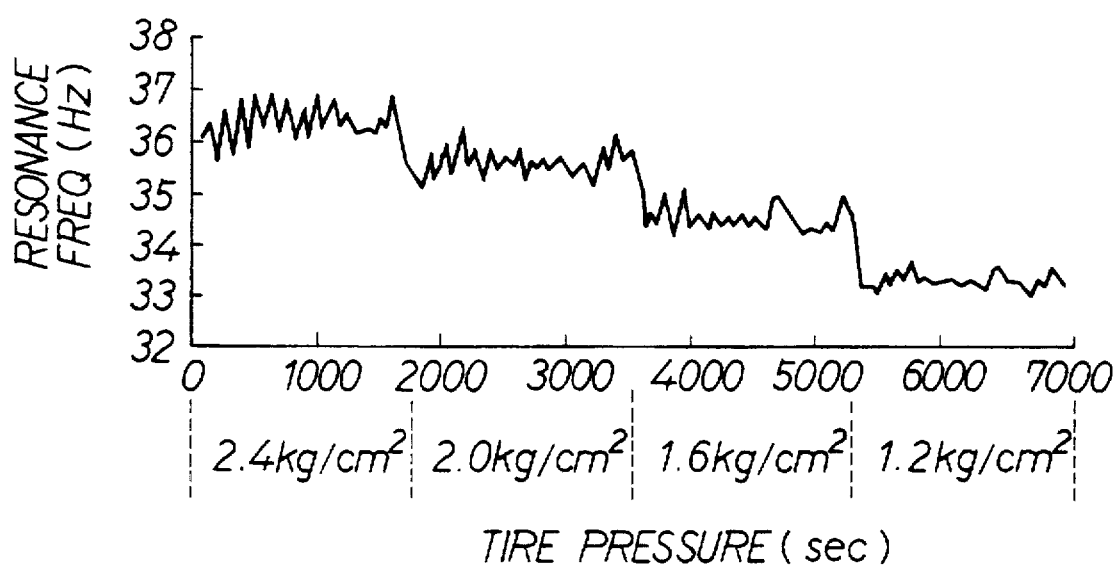
FIG. 9 shows a typical relationship between the resonance frequency ω and the pressure p of a tire obtained by the first embodiment.

As reference information, values of the resonance frequency ω resulting from the estimation carried out by the tire pressure estimating system according to the first embodiment are shown in FIG. 9. It is obvious from the figure that the resonance frequency ω varies essentially linearly with the pressure p of the tire.

In the case of the tire pressure estimating system according to the first embodiment, the resonance frequency ω output by the parameter/resonance frequency converter 214 is supplied to the resonance frequency/pressure converter 215 to be converted into a tire pressure p. The determination unit 22a then determines whether the tire pressure p is abnormal. Since the relationship between the resonance frequency ω and the pressure p of the tire is known to be linear as shown in FIGS. 8 and 9, the resonance frequency/pressure converter 215 can be eliminated. That is, the resonance frequency ω found by the parameter/resonance frequency converter 214 can be directly used to determine whether an abnormality exists in the tire pressure. A signal processor 20 in which the resonance frequency ω found by the parameter/resonance frequency converter 214 is used directly to determine whether an abnormality exists is shown in FIG. 10.

Figure 10:
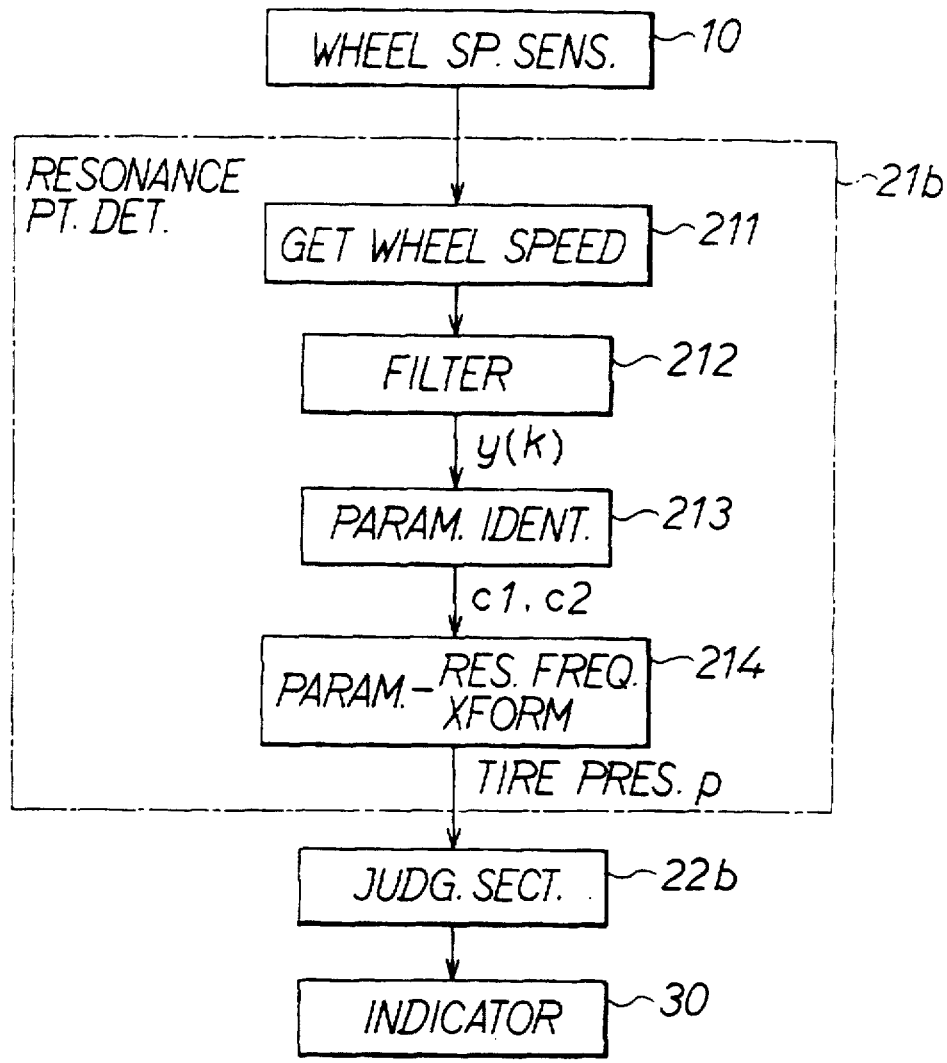
FIG. 10 is a block diagram showing another typical configuration of a resonance point detector employed in the signal processor.

In the case of the signal processor shown in FIG. 10, the resonance frequency ω found by the parameter/resonance frequency converter 214 is output by the resonance point detector 21b as is directly to the determination unit 22b. The determination unit 22b determines whether the pressure p of the associated tire is abnormal by comparing the tire resonance frequency ω output by the resonance point detector 21b with a threshold value for determining the abnormality of the pressure p. The threshold value has been set in advance as a criterion value in the comparison. If the tire resonance frequency ω output by the resonance point detector 21b is lower than the criterion value, the driver is notified of the pressure abnormality via the display unit 30.

As described above, the resonance frequency/pressure converter 215 is eliminated from the signal processor 20, and the table shown in FIG. 8 is not required. As a result, the amount of processing that needs to be carried out in the tire pressure estimating unit as a whole and the capacity of the memory employed therein can be further reduced accordingly.

Even though the amount of processing that needs to be carried out and the required memory capacity are much smaller than those of the conventional tire pressure estimating system adopting the FFT technique, the amount of processing that needs to be carried out by the parameter/resonance frequency converter 214 and the required memory capacity for finding the resonance frequency ω by means of Equation 19 can hardly be considered to be small. In order to further reduce the amount of processing that needs to be carried out and the required memory capacity, a tire pressure estimating system which does not use the parameter/resonance frequency converting system 214 can be implemented. With such a configuration, the tire pressure p is estimated directly from the identified parameters c1 and c2.

In the case of the tire pressure estimating system according to the first embodiment described above, the parameters c1 and c2 are identified and the identified parameters c1 and c2 are then used for finding the attenuation coefficient ζ by using Equation 20. The value of the attenuation coefficient ζ found in this way is in the range 0.005 to 0.02.

Figure 11A:
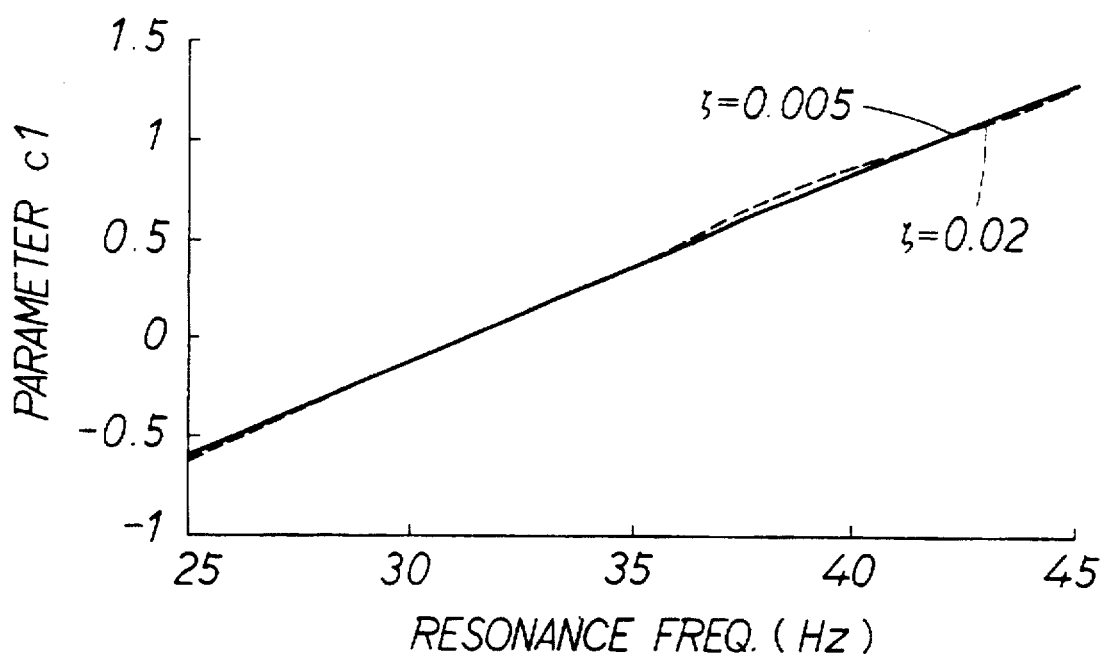
FIGS. 11A and 11B are graphs each representing a relationship between a parameter of the linear prediction model and the resonance frequency with an attenuation coefficient ζ used as a parameter.

For C=0.005 and C=0.02, the relationship between the resonance frequency ω and the parameter c1 is calculated to give results shown in FIG. 11A. Likewise, for C=0.005 and C=0.02, the relationship between the resonance frequency ω and the parameter c2 is calculated to give results shown in FIG. 11B.

Figure 11B:
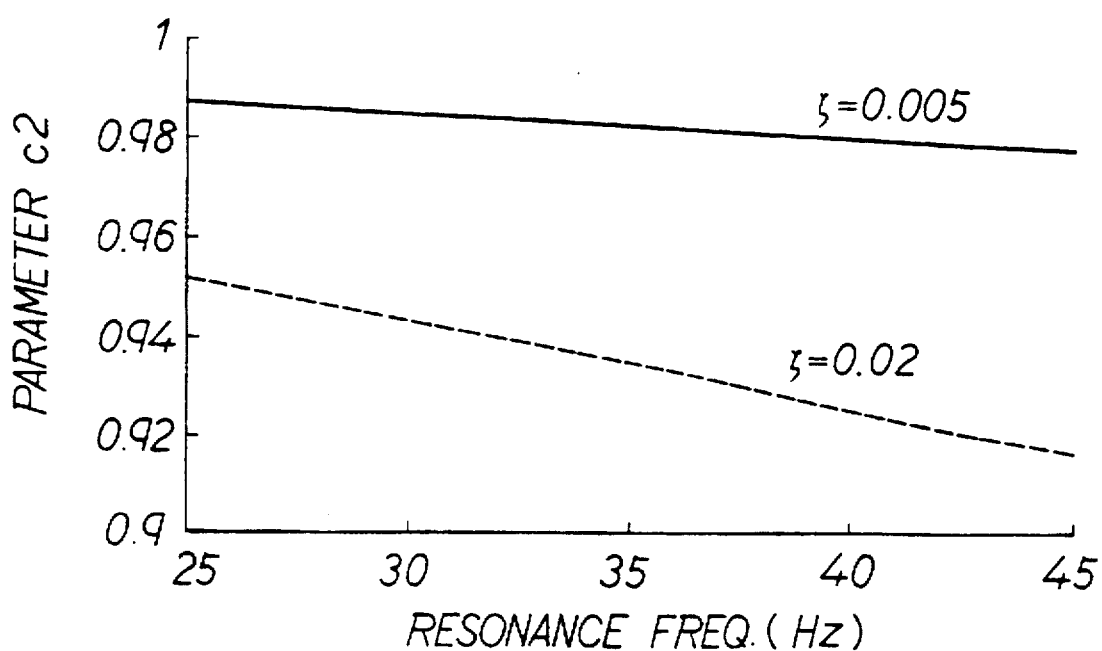

It is obvious from FIGS. 11A and 11B that, over the range of the resonance frequency ω from 32 Hz to 40 Hz which is dependent upon the pressure p of the tire, the parameter c1 greatly changes with the attenuation coefficient ζ while the parameter c2 is essentially independent of the attenuation coefficient ζ. As a result, the resonance frequency ω and, thus, the tire pressure p can be estimated solely from the parameter c1.

A signal processor 20 for estimating the tire pressure p directly from the parameter c1 by using the principle described above is shown in FIG. 12. As shown in this Figure, the resonance point detector 21c has a parameter/pressure converter 216 for converting the parameter c1 identified by the parameter identifying unit 213 directly into a tire pressure p.

As described earlier, the relationship between the tire pressure and the resonance frequency ω is such that the higher the tire pressure, the higher the resonance frequency or, in other words, the lower the tire pressure, the lower the resonance frequency. As shown in FIG. 11A, the relationship between the parameter c1 and the resonance frequency ω is such that the greater the parameter c1, the higher the resonance frequency ω or, in other words, the smaller the parameter c1, the lower the resonance frequency ω. Accordingly, as shown in FIG. 13, the relationship between the parameter c1 and the tire pressure p is such that the greater the parameter c1, the greater the tire pressure p or, in other words, the smaller the parameter c1, the smaller the tire pressure p.

Figure 13:
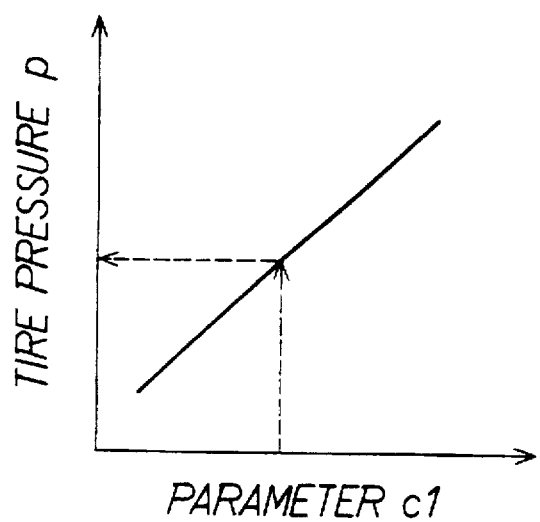
FIG. 13 shows a graph used for converting a parameter c1 frequency into a tire pressure.

The parameter/pressure converter 216 has a table containing the relationship between the parameter c1 and the tire pressure p graphically shown in FIG. 13. The parameter/pressure converter 216 converts an identified parameter c1 directly into a tire pressure p. In this case, the resonance point detector 21c outputs the tire pressure p estimated by the parameter/pressure converter 216 to the determination unit 22a.

As described earlier, the determination unit 22a determines whether the pressure p of the associated tire is abnormal by comparing the tire pressure p output by the resonance point detector 21c with a threshold value for determining the abnormality of the pressure p. The threshold value has been set in advance as a criterion value in the comparison. If the tire pressure p output by the resonance point detector 21c is lower than the criterion value, the driver is notified of the pressure abnormality via the display unit 30.

In this configuration, the parameter/resonance frequency converter 214 for finding the resonance frequency ω from Equation 19 can be eliminated from the signal processor 20, thus allowing the amount of processing that needs to be carried out by the signal processor 20 and the required memory capacity to be further reduced accordingly.

In this configuration, after a parameter c1 is identified by the parameter identifying unit 213, the parameter c1 is converted into a tire pressure p by the parameter/pressure converter 216. Then, the determination unit 22a determines whether the tire pressure p is abnormal. The relationship between the parameter c1 and the tire pressure p is also essentially linear as shown in FIG. 13. As a result, the parameter/pressure converter 216 can be eliminated as well to give a configuration using a processing unit 20 that can determine whether an abnormality of the pressure p of a tire exists directly from the identified parameter c1 as shown in FIG. 14.

Figure 14:
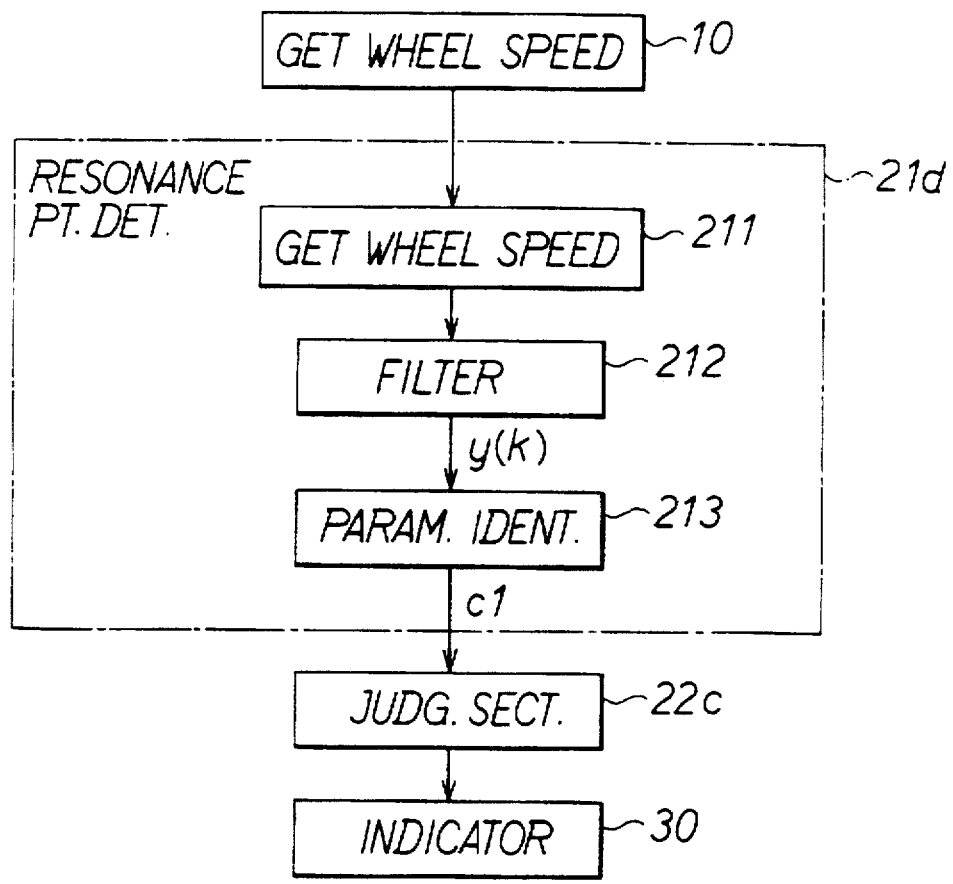
FIG. 14 is a block diagram showing a still further typical configuration of the resonance point detector employed in the signal processor.

In the case of the signal processor 20 shown in FIG. 14, the resonance point detector 21d outputs the parameter c1 identified in the parameter identifying unit 213 as is. Then, the determination unit 22c determines whether the pressure p of the associated tire is abnormal by comparing the parameter c1 output by the resonance point detector 21d with a threshold value for determining the abnormality of the pressure p. The threshold value has been set in advance as a criterion value in the comparison. If the parameter c1 output by the resonance point detector 21d is lower than the criterion value, the driver is notified of the pressure abnormality via the display unit 30.

As described above, the parameter/pressure converter 216 is eliminated from the signal processor 20, and the table shown in FIG. 13 is not required. As a result, the amount of processing that needs to be carried out and the required memory capacity can be further reduced. In comparison with the embodiment shown in FIG. 6, the configuration of the signal processor shown in FIG. 14 is very simple because it does not have the parameter/resonance frequency converter 214 or the resonance frequency/pressure converter 215.

In both of the above-described versions of the first embodiment, the parameter identifying unit 213 identifies the values of the parameters c1 and c2 of the linear prediction model from Equation 16 by using a batch least squares method. For this reason, the values of the parameters c1 and c2 can only be identified once every 60 seconds for N=8,000 as described previously. As a result, the tire pressure estimating system can estimate tire pressure only once every 60 seconds.

If a recursive least squares technique (described later) is used in the estimation of the parameters c1 and c2, the values of the parameters c1 and c2 can be output, and thus the pressure p of the tire can be estimated during each sampling period which is typically 7.8 ms long.

As described earlier, a parameter vector $\theta$ and an measured value vector z are defined as expressed by Equations 12 and 13 from a discrete-time model expressed by Equation 11 which can be rewritten into Equation 14 by using Equations 12 and 13. In the recursive least squares method, Equation 13 corresponding to Equation 14 is set as follows.

$$\theta(k)=\theta(k-1)+P(k)z(k)[y(k)-z^T(k)\theta(k-1)] \quad (23)$$

Under the condition $k \to \infty$, Equation 24 is guaranteed to hold true.

$$-c1=\hat{c}1(k)$$
$$-c2=\hat{c}2(k) \quad (24)$$

For this reason, by using an algorithm based on Equation 23, the parameters c1 and c2, the unknown variables, can be found. Here, the processing of Equation 23 is executed on a real-time basis and, for the sake of convenience, results of the execution are used as the parameters c1 and c2. P as used in Equation 23 is expressed by Equation 25 as follows $$P(k) = P(k-1) - \frac{P(k-1)z(k)z^T(k)P(k-1)}{1+z^T(k)P(k-1)z(k)} \quad (25)$$

$$P(0)=\begin{pmatrix} \gamma & 0 \\ 0 & \gamma \end{pmatrix} \quad (26)$$

$$\gamma > 0$$

P is a 2×2 symmetrical matrix with an initial value given by Equation 26 above.

Figure 15:
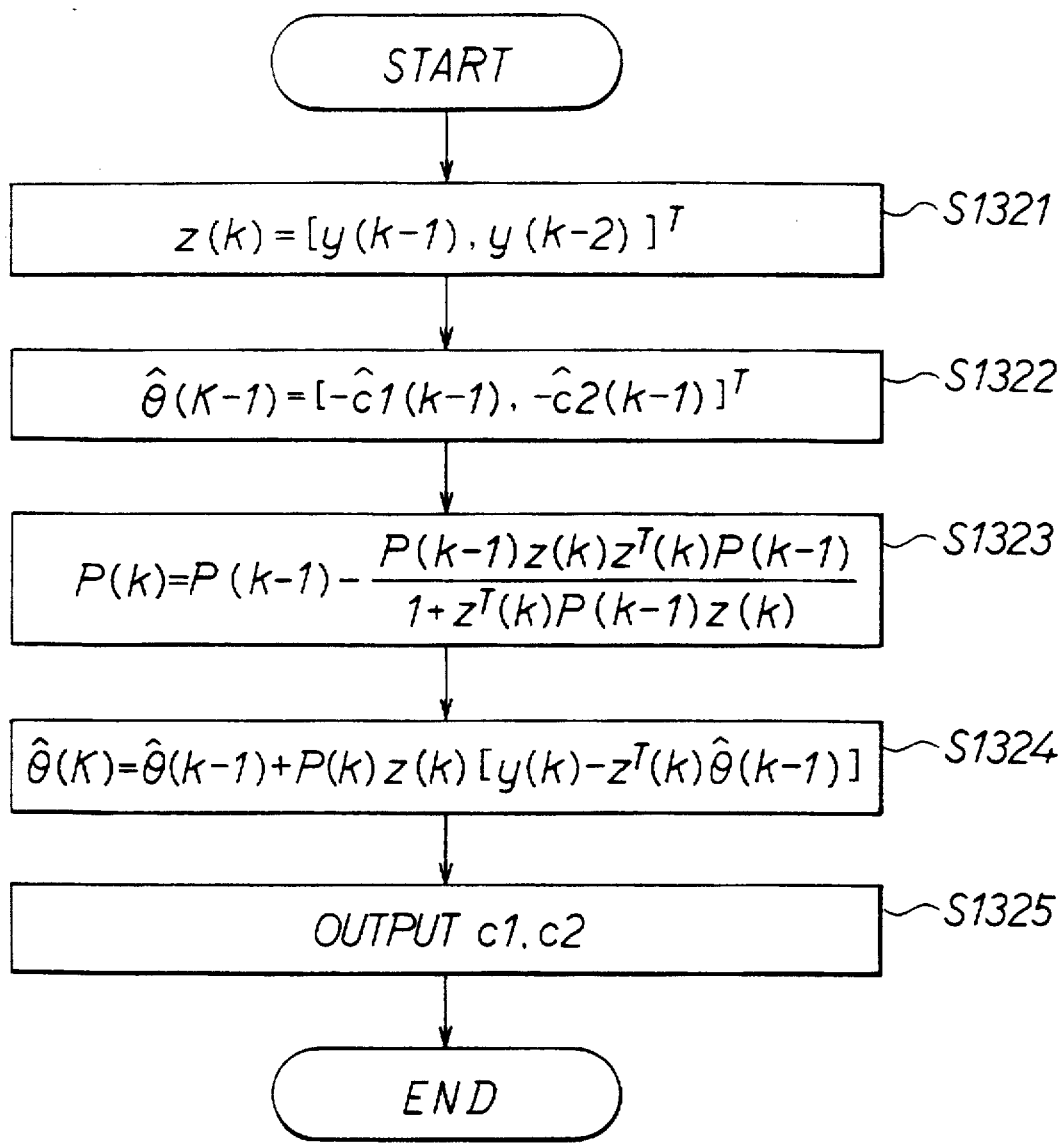
FIG. 15 shows a flowchart of a parameter identifying procedure of a linear prediction model based on a recursive least squares method.

The parameter identifying unit 213 identifies the parameters c1 and c2 by means of the sequential least squares method in accordance with an identification procedure shown in FIG. 15.

In the parameter identifying routine shown in FIG. 15, the parameter vector $\theta$ described above is initialized initially only once as follows.

$$\theta(0)=\begin{pmatrix} 0 \\ 0 \end{pmatrix} \quad (27)$$

Then, after the symmetrical matrix P is initialized as expressed by Equation 26, processing of steps S1321 to S1325 is repeated for each sampling period which is typically 7.8 ms long.

First of all, at the step S1321, the measured value vector z is set in accordance with Equation 28 as follows.

$$z(k)=[y(k-1), y(k-2)]^T \quad (28)$$

Execution then proceeds to a step S1322 to set the parameter vector $\theta$ in accordance with Equation 29 as follows.

$$\theta(k-1)=[-\hat{c}1(k-1), -\hat{c}2(K-1)]^T \quad (29)$$

Subsequently, the flow continues to a step S1323 to set the symmetrical matrix P in accordance with Equation 25 before proceeding to a step S1324 to execute the processing of Equation 23. The parameters c1 and c2 obtained from the processing are output at the next step S1325.

By adopting the recursive least squares method in the identification of the parameters c1 and c2, the parameters c1 and c2 are identified for each sampling period. Subsequently, the estimation of the pressure p of a tire from these parameters c1 and c2 is executed in synchronization with the sampling periods.

As described above, in each of the versions of the first embodiment including the one which adopts the recursive least squares method, the second-order model expressed by Equation 11 is introduced as a linear prediction model it should be noted, however, that a third-order model expressed by Equation 30 or even a higher-order mode can of course be adopted as well.

$$Y(k)=-c1y(k-1)-c2y(k-2)-c3y(k-3)+ d0m(k)+d1m(k-1)+d2m(k-2) \quad (30)$$

It is worth noting, however, that the higher the order of the linear prediction model, the larger the amount of processing that needs to be carried out and the larger the required memory capacity. Nonetheless, considering that there is only one resonance point which depends on the pressure p for each tire, a second-order linear prediction model is sufficient. By using two parameters in the linear prediction model, benefits are gained. For example, the amount of processing that needs to be carried out by the signal processor 20 and the required memory capacity can be minimized as has been described previously.

As described above, correlation noise such as drive wheel in-phase pitch vibration normally exists among a plurality of wheels employed in a vehicle. The existence of such noise reduces the accuracy of the estimation of a tire pressure p based on a signal representing the rotational speed of a vehicle wheel.

Figure 16:
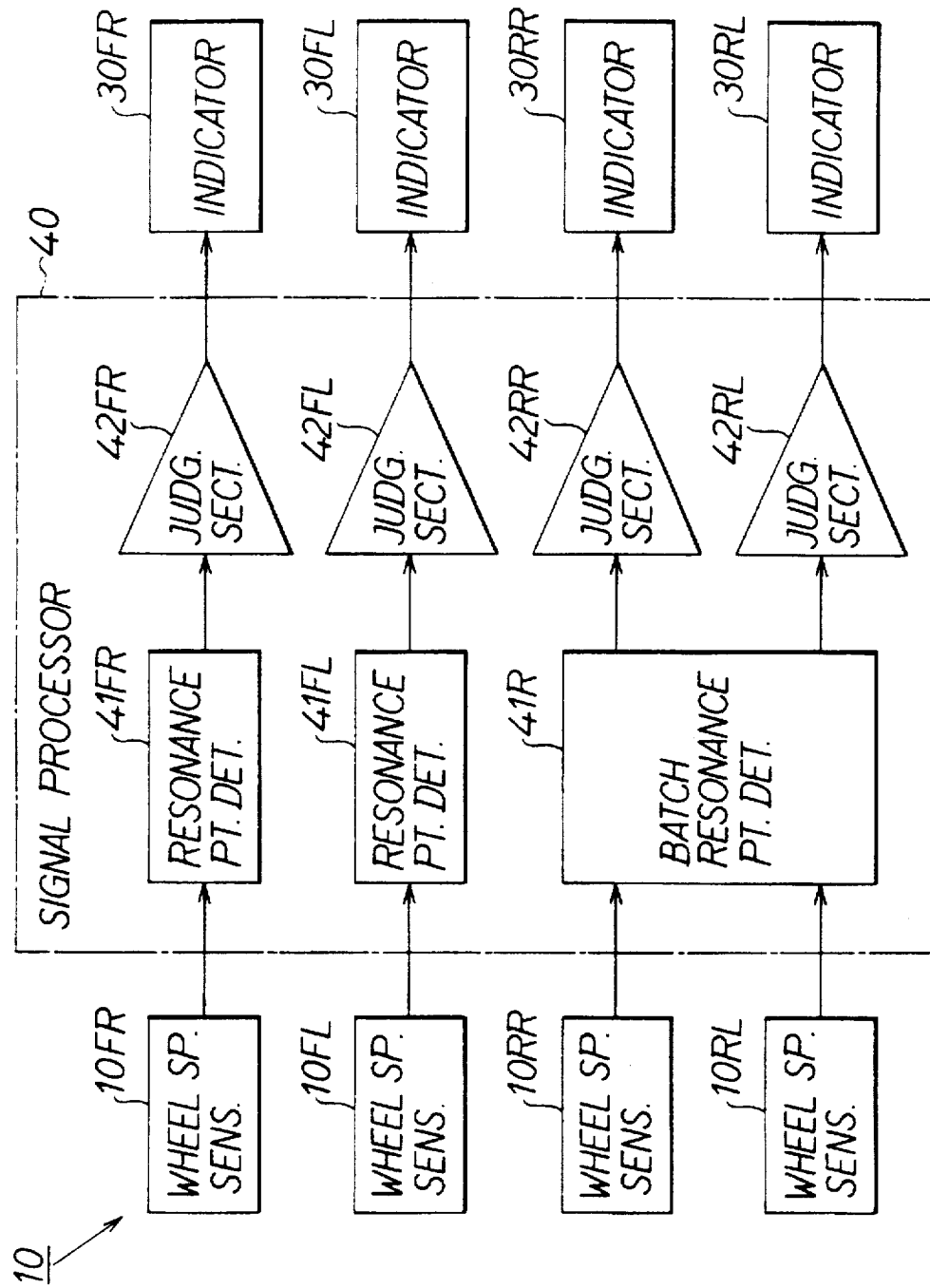
FIG. 16 is a block diagram showing a second embodiment implementing a tire pressure estimating system provided by the present invention.

A second embodiment implementing a tire pressure estimating system in accordance with the present invention is shown in FIG. 16. The tire pressure estimating system according to the second embodiment eliminates effects of the correlation noise caused by in-phase pitch vibration of the drive wheels, thereby allowing the estimation of the tire pressure p based on a signal representing the rotational speed of a vehicle wheel to be carried out with a high degree of accuracy.

In the tire pressure estimating system according to the second embodiment, the rotational speeds of the rear right and rear left vehicle wheels are detected as a piece of observed information used to find a resonance frequency ω which is dependent on the pressures p of the tires. The rear right and rear left vehicle wheels are the drive wheels of a rear wheel-driven vehicle.

Elements shown in FIG. 16 which are identical with those shown in FIG. 1 are denoted by the same reference numerals as those used in FIG. 1 and description thereof is therefore omitted for simplicity and brevity.

As for the front wheels, the driven wheels of the vehicle, the signal processor 40 employed in the tire pressure estimating system as according to the second embodiment estimates the pressures p of the tires as independent measured quantities in order to determine whether an abnormality exists as is the case with the first embodiment described previously.

In the signal processor 40 of the second embodiment, resonance point detectors 41FR and 41FL respectively independently detect the resonance frequencies ω of the front right and front left vehicle wheels which are dependent on the pressures p of the tires thereof, much like the resonance point detectors 21FR and 21FL of the first embodiment. Much like the determination units 22FR and 22FL of the first embodiment, determination units 42FR and 42FL of the second embodiment determine whether abnormalities of the tire pressures exist from the resonance frequencies ω detected by the resonance point detectors 41FR and 41FL respectively. The configuration of the resonance point detectors 41FR and 41FL and the determination units 42FR and 41FL are the same as those of the first embodiment shown in FIG. 6 or of the variations shown in FIGS. 10, 12 and 14.

A batch resonance point detector 41R employed in the signal processor 40 finds resonance frequencies ω from wheel speed signals generated by the wheel speed sensors 10RR and 10RL of the rear right and rear left vehicle wheels, which serve as drive wheels of the vehicle, in batch processing. The resonance frequencies ω are dependent on the pressures p of the tires of the rear right and rear left vehicle wheels.

A concrete configuration of the batch resonance point detector 41R and details of processing carried out by the batch resonance point detector 41R are explained as follows.

First of all, the batch identification of parameters for the rear right and rear left vehicle wheels and the basic principle of the batch estimation of the resonance frequencies ω based on these parameters are described.

Let k denote the number of sampling operations as before, mRR(k) and mRL(k) be the road surface external disturbances for the rear right and rear left vehicle wheels respectively, and yRR(k) and yRL(k) denote the wheel speed signals for the rear right and rear left vehicle wheels respectively. Second-order discrete-time models for the rear right and rear left (RL) vehicle wheels are respectively expressed by Equations 31 and 32.

$$yRR(k)=-cRR1yRR(k-1)-cRR2yRR(k-2)+mRR(k)+eRR(k) \quad (31)$$

$$yRL(k)=-cRL1yRL(k-1)-cRL2yRL(k-2)+mRL(k)+eRL(k) \quad (32)$$

Functions eRR(k) and eRL(k) used in Equations 31 and 32 respectively denote noise transmitted from a shaft which cannot be measured normally. In the case of a rear wheel-driven vehicle in which the second embodiment is implemented, main elements of the noise components eRR(k) and eRL(k) become in-phase pitch noise which is transmitted to the rear wheels via a differential gear. Thus, the noise components eRR(k) and eRL(k) are related to each other by Equation 33 as follows.

$$eRR(k)=eRL(k) \quad (33)$$

That is, if a linear combination representing a difference between Equations 31 and 32 is used, effects of the noise components eRR(k) and eRL(k) can be eliminated as shown by Equation 34 as follows.

$$yRR(k) - yRL(k) = -cRR1yRR(k-1) - cRR2yRR(k-2) + \\ mRR(k) + cRL1yRL(k-1) + cRL2yRL(k-2) - mRL(k) \quad (34)$$

As described earlier, the objective of the identification of parameters is to estimate the unknown parameters cRR1, cRR2, cRL1 and cRL2 by using a finite number of samples of measured data {yRR(k)−yRL(k)}. Also in this case, the unknown parameters cRR1, cRR2, cRL1 and cRL2 are identified by means of a least squares method.

Let θR denote a 4-element parameter vector and zR denote a 4-element measured value vector which are respectively defined by Equations 35 and 36 as follows.

$$\theta R = \begin{pmatrix} -cRR1 \\ -cRR2 \\ cRL1 \\ cRL2 \end{pmatrix} \quad (35)$$

By using Equations 35 and 36, Equation 34 can be $$zR(k) = \begin{pmatrix} yRR(k-1) \\ yRR(k-2) \\ yRL(k-1) \\ yRL(k-2) \end{pmatrix} \quad (36)$$

rewritten into Equation 37 as follows.

$$yRR(k)-yRL(k)=zR^T(k)\theta R+mRR(k)-mRL(k) \quad (37)$$

As described above, mRR(k) and mRL(k) used in Equation 37 each denote external disturbance generated by the surface of a road which can be regarded as white noise. Thus, {mRR(k)−mRL(k)} can be regarded as white noise as well. In this case, the estimation of the unknown parameters cRR1, cRR2, cRL1 and cRL2 is to find values of the unknown parameters cRR1, cRR2, cRL1 and cRL2 which minimize a performance function expressed by Equation 38 as follows.

$$JR = \sum_{k=1}^{N} (mRR(k) - mRL(k))^2 \qquad (38)$$

The values of Equation 35 that minimize a performance function expressed by Equation 38 are found by using the least squares method to give a result expressed by Equation 39. For details, refer to the above-referenced Kanai and Katayama texts.

$$\theta R = \left[ \sum_{k=1}^{N} zR(k)zR^T(k) \right]^{-1} \sum_{k=1}^{N} zR(k)\,(yRR(k) - yRL(k)) \qquad (39)$$

Next, resonance frequencies $\omega RR$ and $\omega RL$ which are dependent on the pressures p of the tires of the rear wheels are found from the parameters $\zeta RR1$, $\zeta RR2$, $\zeta RL1$ and $\zeta RL2$ identified as described above.

Much like the first embodiment, a relationship between the parameter $\zeta RR1$ of the second-order discrete-time model and the resonance frequency $\omega RR$ and the attenuation coefficient $\zeta RR$ is expressed by Equation 40 where T is a sampling period. Likewise, a relationship between the parameter $\zeta RR2$ and the resonance frequency $\omega RR$ and the attenuation coefficient $\zeta RR$ is expressed by Equation 41. Similarly, a relationship between the parameter $\zeta RL1$ and the resonance frequency $\omega RL$ and the attenuation coefficient $\zeta RL$ is expressed by Equation 42. In the same manner, a relationship between the parameter $\zeta RL2$ and the resonance frequency $\omega RL$ and the attenuation coefficient $\zeta RL$ is expressed by Equation 43.

$$cRR1 = -2e^{-2\pi \zeta RR\omega RRT} \cos(2\pi\omega RR \sqrt{1 - \zeta RR^2}\; T) \qquad (40)$$

$$cRR2 = e^{-4\pi \zeta RR\omega RRT} \qquad (41)$$

$$cRL1 = -2e^{-2\pi \zeta RL\omega RLT} \cos(2\pi\omega RL \sqrt{1 - \zeta RL^2}\; T) \qquad (42)$$

$$cRL2 = e^{-4\pi \zeta RL\omega RLT} \qquad (43)$$

From Equations 40 to 43, the resonance frequencies $\omega RR$ and $\omega RL$ as well as the attenuation coefficients $\zeta RR$ and $\zeta RL$ can be calculated to give results expressed by Equations 44 to 47 respectively.

$$\omega RR = \qquad (44)$$

$$\frac{1}{2\pi T} \sqrt{\left(\frac{\log cRR2}{2}\right)^2 + \left[\cos^{-1}\left(\frac{cRR1}{2\sqrt{cRR2}}\right)\right]^2}$$

$$\omega RL = \qquad (45)$$

$$\frac{1}{2\pi T} \sqrt{\left(\frac{\log cRL2}{2}\right)^2 + \left[\cos^{-1}\left(-\frac{cRL1}{2\sqrt{cRL2}}\right)\right]^2}$$

$$\zeta RR = -\frac{1}{4\pi\omega RRT} \log cRR2 \qquad (46)$$

$$\zeta RL = -\frac{1}{4\pi\omega RLT} \log cRL2 \qquad (47)$$

A detailed configuration of the batch resonance point detector 41R for estimating the resonance frequencies $\omega RR$ and $\omega RL$ by using the principle described above is shown in FIG. 17.

Figure 17:
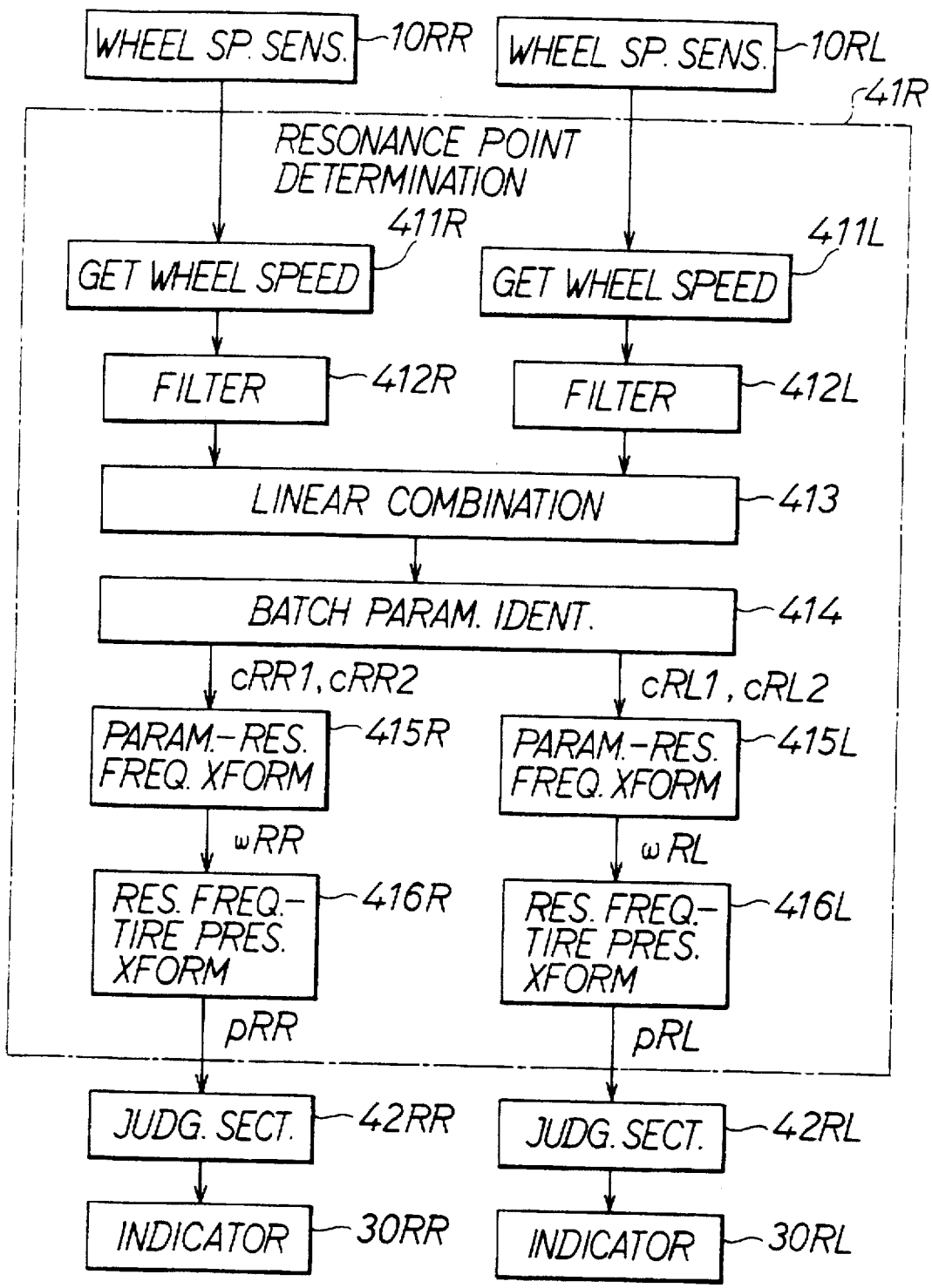
FIG. 17 is a block diagram showing a typical configuration of the resonance point detector employed in the signal processor of the second embodiment.

In a resonance point detector 41R shown in FIG. 17, a wheel speed processing unit 411R reshapes the waveform of an alternating current signal output by a wheel speed sensor 10RR, converting the alternating current into a binary pulse signal. Then, the wheel speed processing unit 411R computes an average value of pulse widths for every predetermined sampling period of, typically, 7.8 ms. The wheel speed processing unit 411R then computes the rotational speed of the vehicle wheel from the reciprocal of the average value. In this way, the wheel speed processing unit 411R can output the computed wheel speed signal in every sampling period. Likewise, a wheel speed processing unit 411L reshapes the waveform of an alternating current signal output by a wheel speed sensor 10RL, converting the alternating current into a binary pulse signal. Then, the wheel speed processing unit 411L computes an average value of pulse widths for every predetermined sampling period of, typically, 7.8 ms. The wheel speed processing unit 411L then computes the rotational speed of the vehicle wheel from the reciprocal of the average value. In this way, the wheel speed processing unit 411L can output the computed wheel speed signal in every sampling period.

A filter 412R passes only components of the wheel speed signal output by the wheel speed processing unit 411R which have frequencies in a band containing the resonance frequency $\omega RR$. As described earlier, the resonance frequency $\omega RR$ is dependent upon the pressure p of the tire of the rear right vehicle wheel. Likewise, a filter 412L passes only components of the wheel speed signal output by the wheel speed processing unit 411L which have frequencies in a band containing the resonance frequency $\omega RL$. As described earlier, the resonance frequency $\omega RL$ is also dependent upon the pressure p of the tire of the rear left vehicle wheel.

The wheel speed signal has a resonance frequency which is equal to that of the member beneath the spring of the vehicle wheel. Actually, the wheel speed signal also includes other resonance components in addition to the component at the resonance frequency $\omega$. In the case of a vehicle, normally a passenger car, in which the second embodiment is implemented, the resonance frequency $\omega$ dependent on the pressure p of the tire is known to have a value in the range 32 Hz to 40 Hz according to experiments. The filters 412R and 412L employed in the tire pressure estimating system according to the second embodiment are both Butterworth filters which have a passband of 30 Hz to 45 Hz. Signal components passing through the filters 412R and 412L are respectively the wheel speed signal yRR(k) and yRL(k) which are defined by the principles described above.

A linear combination processing unit 413 carries out linear combination processing based on Equation 34 for the wheel speed signals yRR(k) and yRL(k) output by the filters 412R and 412L. By carrying out this linear combination processing, effects of noise components eRR(k) and eRL(k) due to in-phase pitch vibration transmitted to the rear right and rear left vehicle wheels via the a differential gear inherent in the drive rear right and rear left vehicle wheels can be eliminated.

Figure 7:
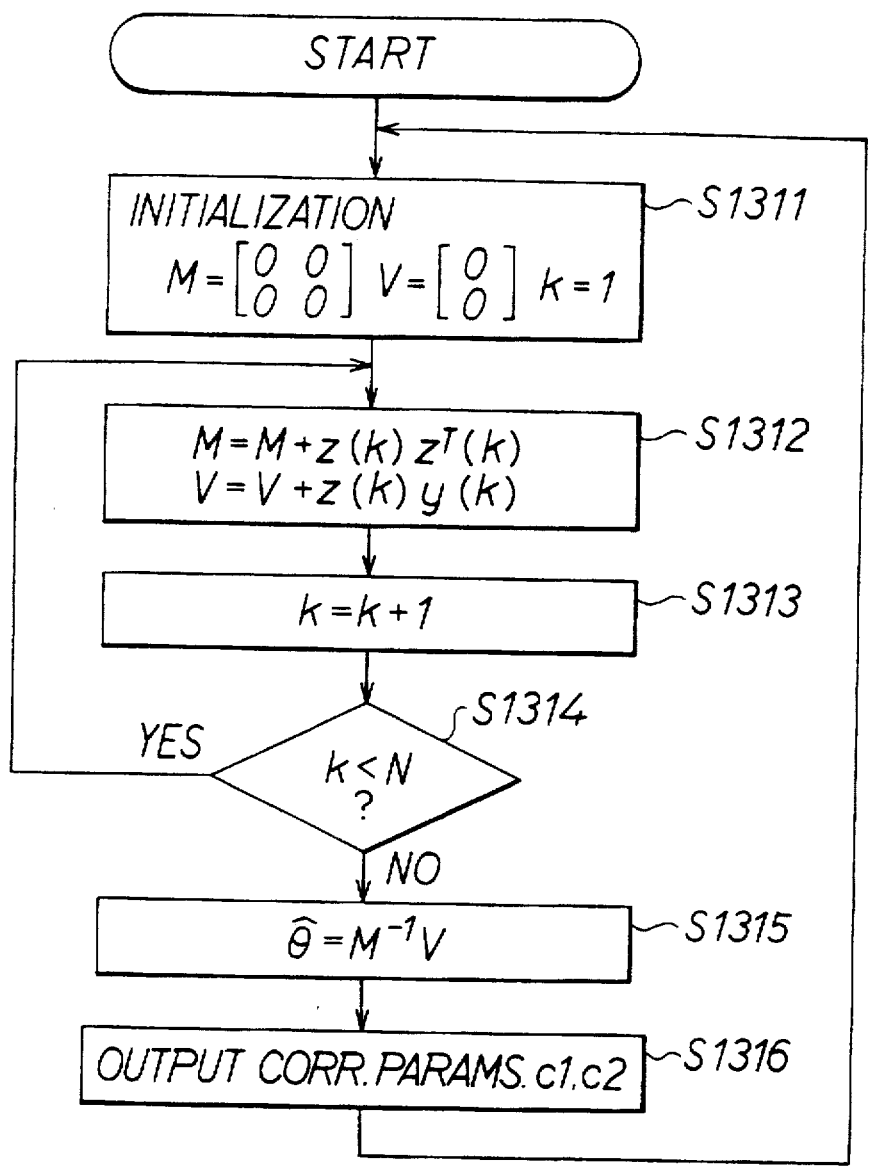
FIG. 7 shows a flowchart of a parameter identifying procedure of a linear prediction model based on a batch least squares method.

A batch parameter identifying unit 414 identifies the parameters cRR1, cRR2, cRL1 and cRL2 of the discrete-time model from the difference between the wheel speed signals {yRR(k)−yRL(k)} resulting from the linear combination processing in accordance with Equation 39 in a batch process. Actually, the parameters cRR1, cRR2, cRL1 and cRL2 are identified by using a batch least squares technique as described above. In this case, a parameter identifying routine shown in FIG. 7 is executed in accordance with Equation 39 to output the parameters cRR1, cRR2, cRL1 and cRL2. For a sampling period of 7.8 ms and a predetermined sampling count of 8,000, the batch parameter identifying unit 414 outputs the parameters cRR1, cRR2, cRL1 and cRL2 once every 60 seconds (=7.8 ms×8,000) which is equal to the product of the sampling period T and the number of sampling operations N.

A parameter/resonance frequency converter 415R converts the parameters cRR1 and cRR2 associated with the rear right vehicle wheel output by the batch parameter identifying unit 414 into a resonance frequency $\omega RR$ thereof in accordance with Equation 44. A resonance frequency/pressure converter 416R then converts the resonance frequency $\omega RR$ into information on the pressure pRR of the tire of the rear right vehicle wheel in accordance with the relationship shown in FIG. 8.

Likewise, a parameter/resonance frequency converter 415L converts the parameters cRL1 and cRL2 associated with the rear left vehicle wheel output by the batch parameter identifying unit 414 into a resonance frequency $\omega RL$ thereof in accordance with Equation 45. A resonance frequency/pressure converter 416L then converts the resonance frequency $\omega RL$ into information on the pressure pRL of the tire of the rear right vehicle wheel in accordance with the relationship shown in FIG. 8.

As shown jointly in FIG. 16, the pressure pRR of the tire of the rear right vehicle wheel and the pressure pRL of the tire of the rear left vehicle wheel estimated in the batch resonance point detector 41R are output to determination units 42RR and 42RL respectively.

Much like the front wheels of the vehicle, the determination unit 42RR determines whether the pressure pRR of the associated tire is abnormal by comparing the pressure pRR output by the batch resonance point detector 41R with a threshold value for determining the abnormality of the pressure pRR. The threshold value has been set in advance as a criterion value in the comparison. If the pressure pRR output by the batch resonance point detector 41R is lower than the criterion value, the driver is notified of the pressure abnormality via a display unit 30RR. When a drive signal is supplied from the determination unit 42RR to the display unit 30RR to notify the driver of the pressure abnormality, the associated lamp 31 shown in FIG. 3 is turned on. The turned-on lamp 31 informs the driver that the tire associated with the lamp 31 has an abnormal pressure pRL. Similarly, a determination unit 42RL determines whether the pressure pRL of the associated tire is abnormal by comparing the pressure pRL output by the batch resonance point detector 41R with a threshold value for determining the abnormality of the pressure pRL. The threshold value has been set in advance as a criterion value in the comparison. If the pressure pRL output by the batch resonance point detector 41R is lower than the criterion value, the driver is notified of the pressure abnormality via a display unit 30RL. When a drive signal is supplied from the determination unit 42RL to the display unit 30RL to notify the driver of the pressure abnormality, the associated lamp 31 shown in FIG. 3 is turned on. The turned-on lamp 31 informs the driver that the tire associated with the lamp 31 has an abnormal pressure pRL.

As described above, much like the first embodiment described previously, according to the tire pressure estimating system according to the second embodiment, when the pressure p of a tire decreases to an abnormal value due to natural leakage, running over a nail or other causes, the driver is informed of the accident immediately as is the case with the first embodiment. After air is replenished to the tire indicated by the warning lamp to restore the pressure p of the tire to an acceptable value, the determination unit 42 stops transmitting the drive signal to the display unit 30. As a result, the turned-on warning lamp 31 is turned off. In this way, the tire pressures are monitored in a desirable way.

Also according to the tire pressure estimating system according to this second embodiment, effects of noise due to in-phase pitch vibration transmitted to the rear vehicle wheels via a differential gear inherent in vehicle wheels can be eliminated as desired, thereby allowing the pressures p of the tires of the drive rear wheels to be estimated with a high degree of accuracy.

The linear prediction models based on Equations 31 and 32 are adopted in the estimation of the pressures p of the tires of the rear wheels and the parameters of these linear prediction models are identified by a combination expressed by Equation 34. As a result, also in this case, the amount of processing that needs to be carried out and the required memory capacity are much smaller than those of the conventional tire pressure estimating system adopting the FFT technique.

Much like the tire pressure estimating system according to the first embodiment, the tire pressure estimating system according to the second embodiment also has a variety of versions that can be obtained from the basic configuration shown in FIG. 17.

For example, the relationship between the resonance frequency $\omega$ and the pressure p of the tire is linear as is shown in FIG. 8. It is thus possible to devise a first variation in which an abnormality of the tire pressures pRR and pRL can be determined directly from the resonance frequencies $\omega RR$ and $\omega RL$ respectively found by the parameter/resonance frequency converters 415R and 415L. In this variation, the table shown in FIG. 8 can be eliminated along with the resonance frequency/pressure converters 416R and 416L. As a result, the amount of processing that needs to be carried out and the required memory capacity in the tire pressure estimating system as a whole can be further reduced.

It is also possible to use another variation where relationships between the identified parameters cRR1, cRR2, cRL1 and cRL2 of the linear prediction models and the pressure p of the tire are stored in memory in advance as a table or a map. By using this table, the tire pressures pRR and pRL can be estimated directly from the parameters cRR1, cRR2, cRL1 and cRL2. In this variation, the parameter/resonance frequency converters 415R and 415L and the processing of Equations 44 and 45 can thus be eliminated. As a result, the amount of processing that needs to be carried out and the required memory capacity in the tire pressure estimating system as a whole can be further reduced accordingly. It should be noted that much like the version of the first embodiment explained previously by referring to FIG. 12, the tire pressures pRR and pRL can be estimated using only the parameters cRR1 and cRL1 independently of the value of the attenuation coefficient $\zeta$.

The relationship between the parameters cRR1 and cRL1 and the tire pressures p pRR and pRL respectively is essentially linear as is shown in FIG. 13. It is thus also possible to devise still another variation in which the abnormality of the tire pressure pRR or pRL can be respectively determined directly from the parameter cRR1 or cRL1. In this configuration, the parameter/resonance frequency converters 415R and 415L, the resonance frequency/pressure converters 416R and 416L, the table shown in FIG. 13 and the processing of Equations 44 and 45 can therefore be eliminated. As a result, the amount of processing that needs to be carried out and the required memory capacity in the tire pressure estimating system as a whole can be further reduced accordingly.

In the batch parameter identifying unit 414 of yet another variation, the parameters cRR1, cRR2, cRL1 and cRL2 are identified by using the least squares technique in a batch process. To be more specific, in this configuration, the parameters cRR1, cRR2, cRL1 and cRL2 are identified in every sampling period of typically 7.8 ms and, subsequently, the estimation of the pressures pRR and pRL of the tires based on these parameters cRR1, cRR2, cRL1 and cRL2 is carried out in synchronization with the sampling periods. The sequential least squares method is applied in conformity with Equations 23 to 26 and FIG. 15.

In another variation, a third-order linear prediction model or a higher-order linear prediction model including the use of the recursive least squares method is adopted. However, much like the first embodiment described previously, the higher the order of the linear prediction model, the larger the amount of processing that needs to be carried out and the larger the required memory capacity. Considering that there is only one resonance point which is dependent on the pressure p for each tire, a second-order linear prediction model is sufficient. By using two parameters in the linear prediction model, benefits are gained. For example, the amount of processing that needs to be carried out by the signal processor 40 and the required memory capacity can be minimized as has been described previously.

In the case of the tire pressure estimating system according to the second embodiment, on the other hand, effects of noise due to in-phase pitch vibration transmitted to the rear vehicle wheels via a differential gear inherent in vehicle wheels can be eliminated as desired by removing the noise components eRR(k) and eRL(k) by means of a linear combination process based on Equation 34 for the linear prediction models introduced in accordance with Equations 31 and 32. In general, however, a combined linear combination which is obtained by adding the linear prediction model yRR(k) of Equation 31 multiplied by a coefficient aRR to the linear prediction model yRL(k) of Equation 32 multiplied by a coefficient aRL as expressed by Equation 48 as follows is devised.

It should be noted, however, that the tire pressure estimating system according to the third embodiment is basically the same as those according to the first and second embodiment except that, in the case of the third embodiment, interference noise components are added as an objects to be eliminated.

By carrying out linear combination processing in conformity with Equations 48 to 50, effects of the interference noise components can be eliminated with a high degree of precision.

Thereafter, parameters of a model based on the linear combination are identified by means of a least squares technique. By defining a parameter vector and a measured value vector each as an eight element vector, an identification procedure basically identical with that of the first or second embodiment can be adopted.

Given the assumptions described above, the configuration and operations of the signal processor 50 employed in the tire pressure estimating system as according to the third embodiment are explained as follows.

First of all, a wheel speed processing unit 51FR shapes the waveform of a signal output by the wheel speed sensor 10FR, converting the analog signal into a digital pulse signal. Then, the wheel speed processing unit 51FR computes an average value of pulse widths for every predetermined sampling period of, typically, 7.8 ms. The wheel speed processing unit 51FR then computes the rotational speed of the vehicle wheel from the reciprocal of the average value. In this way, the wheel speed processing unit 51FR can output the computed wheel speed signal in every sampling period. Similar processing is performed by other components for the other wheels.

A filter 52FR passes only components of the wheel speed signal output by the wheel speed processing unit 51FR which have frequencies in a band containing the resonance $$aRRyRR(k) + aRLyRL(k) \qquad (48)$$
$$= aRR[-cRR1yRR(k-1) - cRR2yRR(k-2) + mRR(k) + eRR(k)]$$
$$+ aRL[-cRL1yRL(k-1) - cRL2yRL(k-2) + mRL(k) + eRL(k)]$$

In this way, the linear estimation can cope with various kinds of interference noise in addition to the noise caused by the in-phase pitch vibration. In the case of the tire pressure estimating system according to the second embodiment wherein effects of the noise caused by the in-phase pitch vibration are eliminated, the coefficients aRR and aRL can be set by taking the relationship expressed by Equation 33 into consideration as follows.

$$aRR = 1 \qquad (49)$$
$$aRL = -1 \qquad (50)$$

With the coefficients aRR and aRL set by Equations 49 and 50 respectively, the relationship expressed by Equation 34 from which the noise components eRR(k) and eRL(k) are eliminated is obtained.

Figure 18:
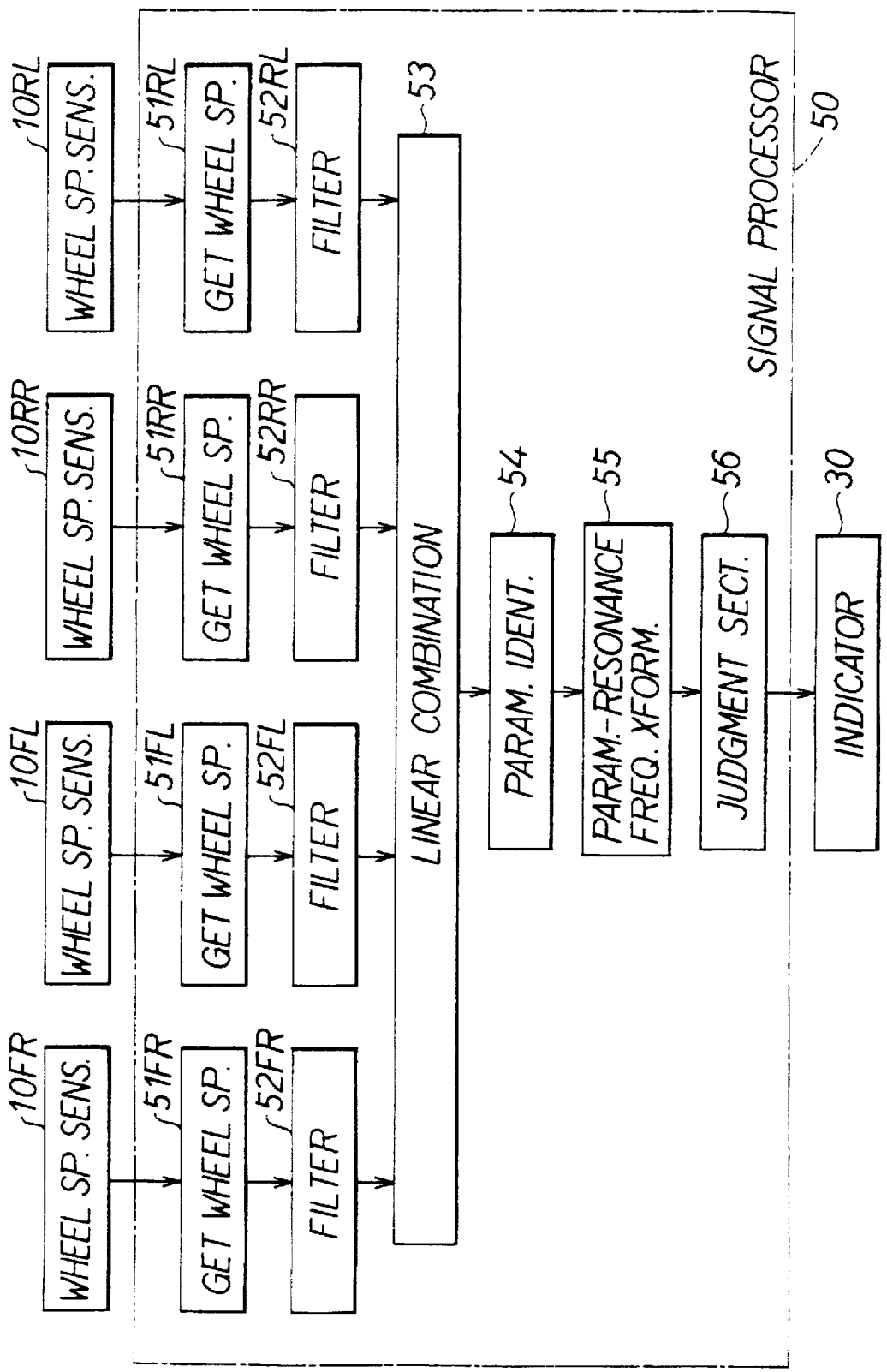
FIG. 18 is a block diagram showing a third embodiment implementing a tire pressure estimating system provided by the present invention.

A third embodiment implementing a tire pressure estimating system in accordance with the present invention is shown in FIG. 18. This system eliminates effects of all kinds of interference noise generated between the wheels of a vehicle.

As shown in the Figure, in the case of the tire pressure estimating system according to the third embodiment, all the wheel speed signals undergo a linear combination process before parameters of the linear prediction model are identified in a batch process.

frequency ω. As described earlier, the resonance frequency ω is dependent upon the pressure p of the tire. The filter 52FR employed in the tire pressure estimating system according to the third embodiment is a Butterworth filter having a passband of 30 Hz to 45 Hz. Similar processing is performed for the other wheels by other system components.

A linear combination processing unit 53 carries out linear combination processing based on Equations 48 to 50 for the wheel speed signals output by the filters 52FR, 52FL, 52RR and 52RL. By carrying out this linear combination processing, effects of interference noise components can be eliminated with a high degree of accuracy as described above.

A parameter identifying unit 54 identifies the parameters of the linear prediction model for the wheel speed signals which undergo the linear combination processing cited above by means of, typically, the batch least squares method. In the case of second-order linear prediction models, parameters to be identified are cFR1, cFR2, cFL1, cFL2, cRR1, cRR2, cRL1 and cRL2. If the batch least squares technique is adopted as described above, the parameter identifying unit 54 outputs the parameters cFR1, cFR2, CFL1, CFL2, CRR1, cRR2, cRL1 and cRL2 once for every period equal to the sampling period T multiplied by the number of sampling operations N.

A parameter/resonance frequency converter 55 converts the parameters output by the parameter identifying unit 54 into resonance frequencies which are dependent on the pressures p of the tires of the associated vehicle wheels in accordance with Equations 44 and 45. The resonance frequencies ω can then be converted into information on the pressures p of the tires of the vehicle wheels. The resonance frequencies ω or the tire pressures p are subsequently supplied to a determination unit 56.

The determination unit 56 determines whether the tire pressure p is abnormal by comparing the resonance frequency or the tire pressure p with a threshold value for determining the abnormality of the pressure p. The threshold value has been set in advance as a criterion value in the comparison. If the resonance frequency ω or the tire pressure p is lower than the criterion value, the driver is notified of the pressure abnormality via the display unit 30. When a drive signal is supplied from the determination unit 56 to the display unit 30 to notify the driver of the pressure abnormality, the associated lamp 31 shown in FIG. 3 is turned on. The turned-on lamp 31 informs the driver that the tire associated with the lamp 31 has an abnormal pressure p as is the case with the embodiments described previously.

As described above, much like the embodiments described previously, according to the tire pressure estimating system according to the third embodiment, when the pressure p of a tire decreases to an abnormal value due to natural leakage, running over a nail or other causes, the driver is informed of the accident immediately as is the case with the first embodiment. After air is replenished to the tire indicated by the warning lamp to restore the pressure p of the tire to an acceptable level, the determination unit 56 stops transmitting the drive signal to the display unit 30. As a result, the turned-on warning lamp 31 is turned off. In this way, the tire pressures are monitored in a desirable way.

Also according to the tire pressure estimating system according to this third embodiment, effects of interference noise generated between the vehicle wheels can be eliminated as desired for all the vehicle wheels, thereby allowing the pressures p of the tires to be estimated with a high degree of accuracy.

Also in the case of the tire pressure estimating system according to the third embodiment, linear prediction models for wheel speed signals which can cope with tire vibration are adopted for identifying parameters in the estimation of the pressures p of the tires. As a result, also in this case, the amount of processing that needs to be carried out and the required memory capacity are much smaller than those of the conventional tire pressure estimating system adopting the FFT technique.

Much like the tire pressure estimating system according to the second embodiment, the tire pressure estimating system according to the third embodiment has a number of corresponding variations.

In the case of the second and third embodiments, a plurality of vehicle wheel models are combined into a linear combination. It should be noted, however, that for non-linear correlation noise existing among a plurality of vehicle wheels, the vehicle wheel models can also be combined into a non-linear combination. That is, any configuration will work as long as the configuration allows linear or non-linear combination processing which is adapted to the type of correlation noise to be carried out to eliminate effects of the noise.

The vehicle wheels for which the combination processing is carried out can be other than the vehicle wheels of the second and third embodiments. For example, the processing can be carried out for the front right and rear right wheels, the front left and rear left wheels, the front right and rear left wheels or the front left and rear right wheels.

In the above-described embodiments, the amount of processing that needs to be carried out and the required memory capacity can be reduced substantially. Effects of correlation noise existing among a plurality of vehicle wheels can be eliminated as desired, thereby allowing the pressure p of a tire to be estimated with a high degree of accuracy. However, the measurement accuracy may be decreased due to conditions of a road on which the vehicle is running.

In the case of a road with a small amount of roughness such as a snowy road, for example, the input from the surface of the road decreases. Thus, the amount of tire vibration is also reduced and the magnitudes of resonance components of the rotational speed of the vehicle wheel decrease as well. As a result, when the resonance components are extracted from the rotational speed of a vehicle wheel, the S/N ratio is poor, consequently making it impossible to extract a resonance frequency with a high degree of accuracy.

In the case of an asphalt road that has a bump on the surface thereof, on the other hand, the input from the surface of the road increases transiently, again making it impossible to extract the resonance frequency with a high degree of accuracy. Also in this case, the accuracy of the estimation of a tire pressure p decreases.

Figure 19:
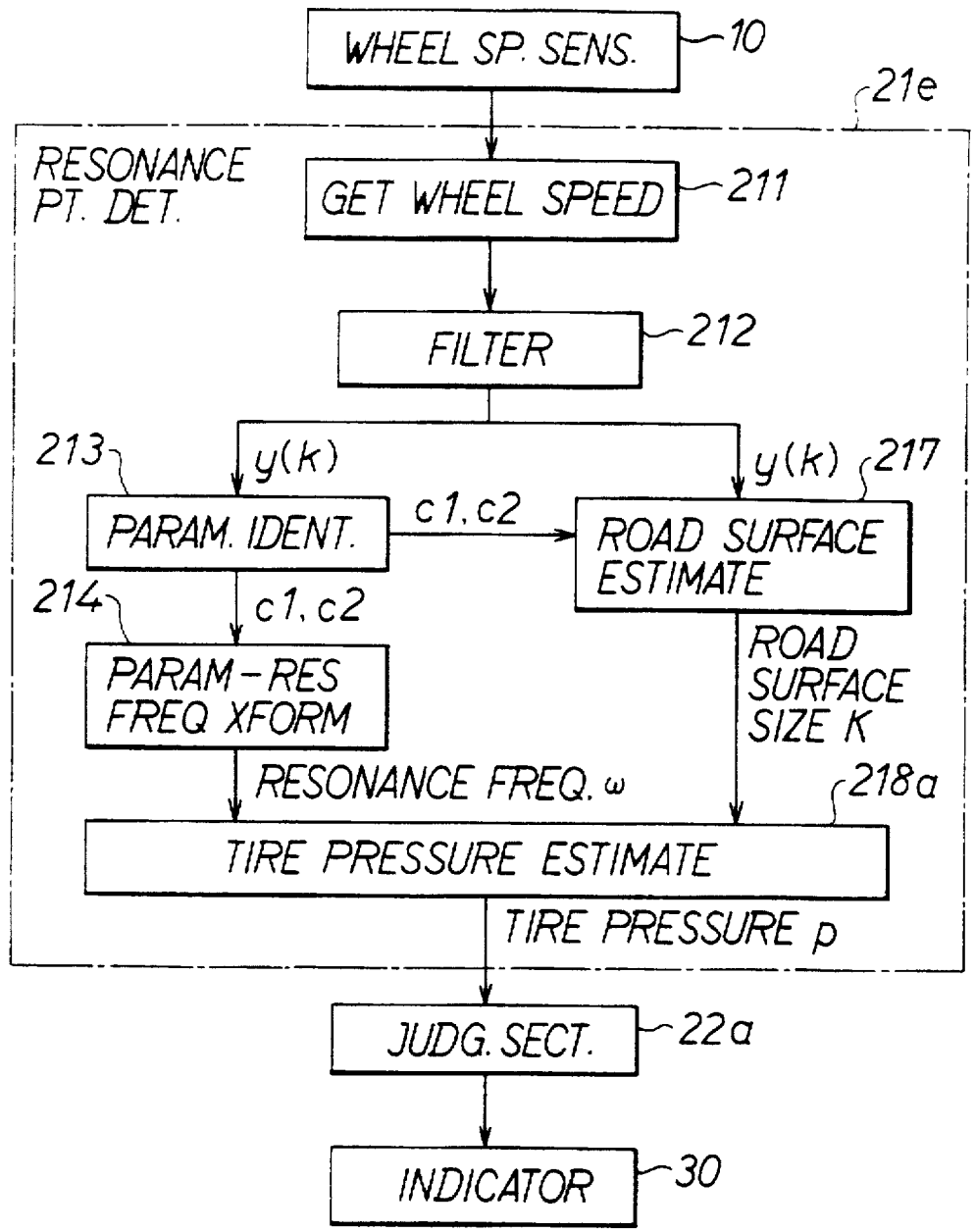
FIG. 19 is a block diagram showing a fourth embodiment implementing a tire pressure estimating system provided by the present invention.

In order to solve the problems described above, the present invention provides a fourth embodiment implementing the tire pressure estimating system shown in FIG. 19. The fourth embodiment can determine whether the surface of a road is not normal from the magnitude of an input from the road. In the case of an abnormal road surface, the estimation of the pressure p of a tire is halted. In this way, the tire pressure estimating system according to the fourth embodiment can maintain a high estimation accuracy.

The tire pressure estimating system according to the fourth embodiment is obtained by rearranging the tire pressure system of the first embodiment shown in FIGS. 1 to 6. Identical components performing identical functions as in previous embodiments have the same reference numerals and will not be described further herein for simplicity and brevity.

Components employed in a resonance point detector 21e shown in FIG. 19 which are identical with those employed in the resonance point detector 21a shown in FIG. 6 are denoted by the same reference numerals as those used for denoting the components shown in FIG. 6.

The wheel speed processing unit 211 employed in the resonance point detector 21e shapes the waveform of a signal output by the wheel speed sensor 10, converting the signal into a digital pulse signal. Then, the wheel speed processing unit 211 computes an average value of pulse widths for every predetermined sampling period of, typically, 7.8 ms. The wheel speed processing unit 211 then computes the rotational speed of the vehicle wheel from the reciprocal of the average value. In this way, the wheel speed processing unit 211 can output the computed wheel speed signal in every sampling period.

The filter 212 passes only components of the wheel speed signal output by the wheel speed processing unit 211 which have frequencies close to the resonance frequency ω. As described earlier, the resonance frequency ω is dependent upon the pressure p of the tire.

The wheel speed signal has a resonance frequency which is equal to that of the member beneath the spring of the vehicle wheel. Actually, the wheel speed signal also includes other resonance components in addition to the component at the resonance frequency ω. Signal components in the bandwidth 32 Hz to 45 Hz are passed on by the filter 212 to obtain a wheel speed signal y(k) defined by Equation 11 as described earlier.

The parameter identifying unit 213 identifies the parameters c1 and c2 of the linear estimation model in accordance with Equation 16 from the wheel speed signal y(k) which was extracted by the filter 212. A procedure for identifying the parameters c1 and c2 by means of the batch least squares method is shown in FIG. 7.

In the case of the fourth embodiment, however, the number of sampling operations N is set at 2,500. As a result, the parameter identifying unit 213 outputs a couple of values of the parameters c1 and c2 every 20 seconds or so (i.e., the sampling period T×N=7.8 ms×2,500).

In the resonance point detector 21e, the parameters c1 and c2 output by the parameter identifying unit 213 are supplied to the parameter/resonance frequency converter 214 and a road surface input estimating unit 217.

The parameter/resonance frequency converter 214 employed in the resonance point detecting system 21e converts the identified parameters c1 and c2 into a resonance frequency ω by executing processing of Equation 19 as described previously.

On the other hand, the road surface input estimating unit 217 estimates the magnitude K of road surface inputs from the wheel speed signal y(k) defined earlier.

Recalling that the wheel speed signal y(k) is defined by Equation 11 and that the parameters c1 and c2 are identified by minimizing the performance function J expressed by Equation 15, the magnitude K of the road surface inputs can be found as the square root of the performance function J, that is, the square root of the sum of the squares of the inputs m(k).

Substituting Equation 11 into Equation 15 yields Equation 51 expressing the evaluation function J as follows.

$$J = \sum_{k=1}^{N} m^2(k) = \sum_{k=1}^{N} \{y(k) + c1y(k-1) + c2y(k-2)\}^2 \quad (51)$$

By using Equations 12, 13 and 16, Equation 51 expressing the evaluation function J can be further rewritten into Equation 52 as follows.

$$J = \sum_{k=1}^{N} m^2(k) = \sum_{k=1}^{N} \{y^2(k) + c1y(k)y(k-1) + c2y(k)y(k-2)\} \quad (52)$$

Thus, the magnitude K of the road surface inputs, that is, the square root of the performance function J can be expressed by Equation 53 as follows.

$$K = \sqrt{\sum_{k=1}^{N} m^2(k)} = \sqrt{\sum_{k=1}^{N} \{y^2(k) + c1y(k)y(k-1) + c2y(k)y(k-2)\}} \quad (53)$$

The road surface input estimating unit 217 estimates the magnitude K of the road surface inputs from the parameters c1 and c2 output by the parameter identifying unit 213 in accordance with Equation 53. The magnitude K of the road surface inputs estimated in this way is supplied to a pressure estimating unit 218a along with the resonance frequency ω found by the parameter/resonance frequency converter 214.

Figure 20:
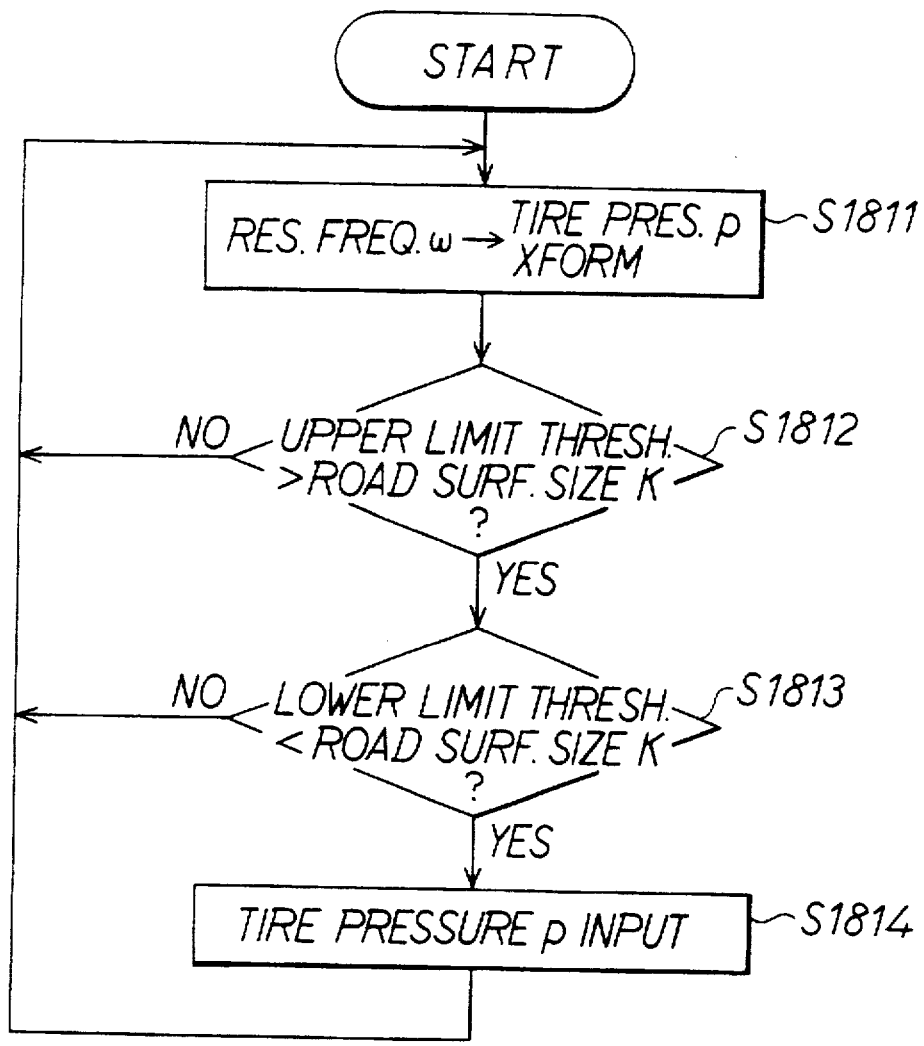
FIG. 20 shows a flowchart of a pressure identifying procedure according to the fourth embodiment.

The pressure estimating unit 218a converts the resonance frequency ω found by the parameter/resonance frequency converter 214 into a pressure p in accordance with a pressure estimating routine shown in FIG. 20 and, at the same time, determines whether the pressure p is to be supplied to the determination unit 22a depending upon the magnitude K of the road surface inputs.

First of all, at a step S1811 of the pressure estimating routine shown in FIG. 20, the pressure estimating unit 218a converts the resonance frequency ω found by the parameter/resonance frequency converter 214 into a pressure p by using a relationship shown in FIG. 8. Execution then proceeds to steps S1812 and S1813 to check the reliability of the value of the pressure p found at the step S1811 by examining the magnitude K of the road surface inputs estimated by the road surface input estimating unit 217. That is, the magnitude K of the road surface inputs is examined to find out whether it is smaller than or equal to a predetermined upper threshold value but greater than or equal to a predetermined lower threshold value. The flow then proceeds to a step S1814 to supply the value of the pressure p found by the pressure estimating unit 218a to the determination unit 22a only if the magnitude K of the road surface inputs is smaller than or equal to the predetermined upper threshold value at the step S1812 and greater than or equal to the predetermined lower threshold value at the step S1813. In other words, if the magnitude K of the road surface inputs is greater than the predetermined upper threshold value at the step S1812 or smaller than the predetermined lower threshold value at the step S1813, the outputting of the value of the pressure p found by the pressure estimating unit 218a to the determination unit 22a for this magnitude K of the road surface inputs is inhibited. For this reason, the upper and lower threshold values are typically determined in advance as follows.

The upper threshold value is a limit determined from the magnitude K of road surface inputs obtained for a transient large road surface input caused by a bump or the like on the road.

The lower threshold value is a limit determined from the magnitude K of road surface inputs obtained for a road with small amount of roughness and, thus, a poor S/N ratio, such as a snowy road.

By setting the upper and lower threshold values as described above, a value of the pressure p estimated from a bumpy or snowy road with a low degree of reliability that can cause deterioration of accuracy is excluded. Only a value of the pressure p which is estimated from a road of normal conditions with a high degree of reliability is supplied selectively to the determination unit 22a.

As described previously, the determination unit 22a (including the determination sub-units 22FR, 22FL, 22RR and 22RL) determines whether the tire pressure p is abnormal by comparing the tire pressure p output by the pressure estimating unit 218a of the resonance point detector 21e with a threshold value for determining the abnormality of the pressure p. The threshold value has been set in advance as a criterion value in the comparison. If the tire pressure p output by the pressure estimating unit 218a of the resonance point detector 21e is lower than the criterion value, the driver is notified of the pressure abnormality via the display unit 30 (30FR, 30FL, 30RR and 30RL).

When a drive signal is supplied from the determination unit 22a to the display unit 30 to notify the driver of the pressure abnormality, the associated lamp 31 shown in FIG. 3 is turned on. The turned-on lamp 31 informs the driver that the tire associated with the lamp 31 has an abnormal pressure p as is the case with the embodiments described previously.

The tire pressure estimating system according to the fourth embodiment offers the following extremely meaningful features.

When the pressure p of a tire decreases to an abnormal value due to natural leakage, running over a nail or other causes, the driver is in formed of the accident immediately as is the case with the first embodiment. After air is replenished to the tire pointed out by the warning lamp to restore the pressure p of the tire to an acceptable level, the determination unit 22a stops transmitting the drive signal to the display unit 30. As a result, the turned-on warning lamp 31 is turned off.

The tire suspension system of the vehicle is approximated by a linear prediction model represented by Equation 11. The parameters of the linear prediction model are identified by using a least squares technique. The resonance frequency of the wheel speed signal y(k) which is dependent on the tire pressure is then estimated. As a result, the amount of processing that needs to be carried out and the required memory capacity are much smaller than those of the conventional tire pressure estimating system adopting the FFT method.

In the case of a road with a small amount of roughness such as a snowy road or even an asphalt road that has a bump on the surface thereof, that is, in the case of a road having an abnormal surface, the estimation of the pressure p of a tire is halted. In this way, the tire pressure estimating system according to the fourth embodiment can maintain a high estimation accuracy.

The tire pressure estimating system according to a fourth embodiment of the invention shown in FIG. 19 can determine whether the surface of a road is abnormal from the magnitude K of road surface inputs. The determination as to whether the surface of a road is abnormal can also be made by monitoring the attenuation coefficient $\zeta$ of the resonance component which can be computed in accordance with Equation 20. Normally, for large values of K representing the magnitude of road surface inputs, the attenuation coefficient $\zeta$ of the resonance frequency $\omega$ decreases. Conversely, for small values of K representing the magnitude of road surface inputs, the attenuation coefficient $\zeta$ of the resonance frequency $\omega$ increases. Relationships between the attenuation coefficient $\zeta$ and the magnitude of the resonance component are shown in FIGS. 21A and 21B.

Figure 21A:
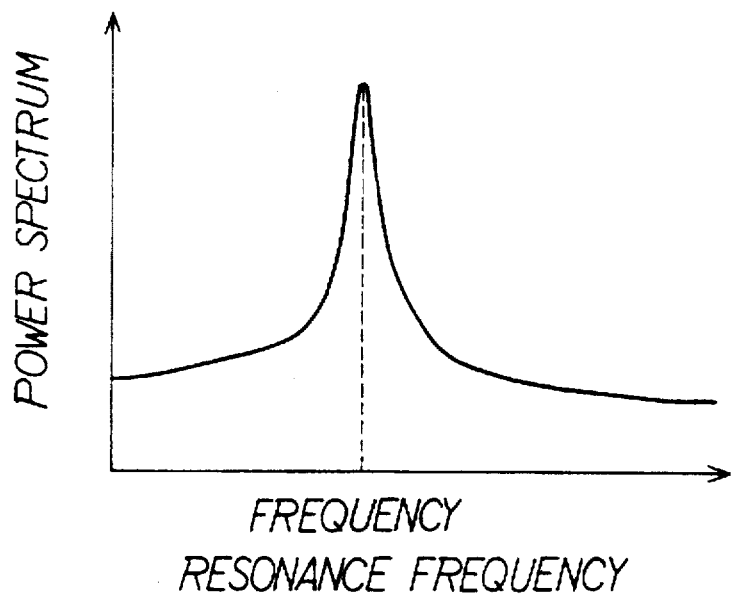
FIGS. 21A and 21B are graphs each representing a relationship between the attenuation coefficient ζ and the magnitude of a resonance component.

As shown in FIG. 21A, for a small value of the attenuation coefficient $\zeta$, power spectra are concentrated at the resonance point. This implies that, for a small values of the attenuation coefficient $\zeta$, the resonance component at the resonance frequency $\omega$ is large. This trend becomes even more obvious for an asphalt road that has a bump on the surface thereof as described previously wherein the input from the surface of the road transiently increases.

Figure 21B:
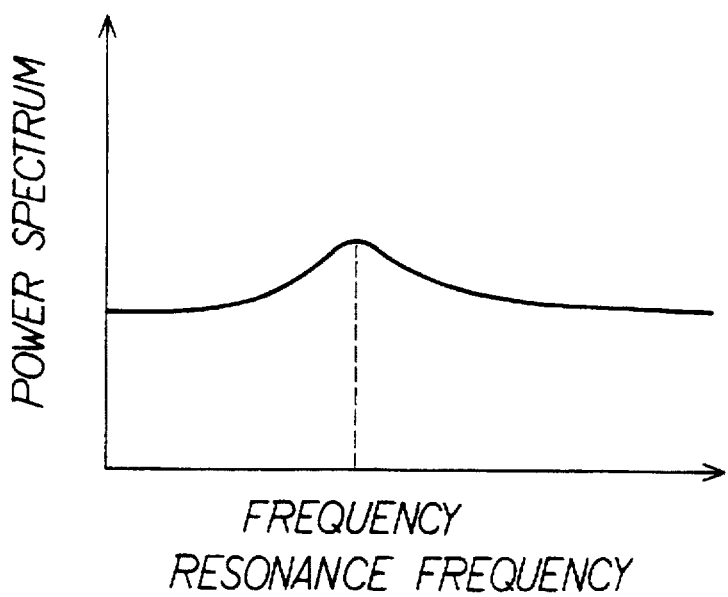

As shown in FIG. 21B, for a large value of the attenuation coefficient $\zeta$, on the other hand, power spectra are spread at the resonance point. This implies that, for a large values of the attenuation coefficient $\zeta$, the resonance component at the resonance frequency $\omega$ is small. This trend becomes even more obvious for an snowy road having a small amount of roughness as described previously wherein the input from the surface of the road decreases.

Accordingly, by monitoring the magnitude of the attenuation coefficient $\zeta$, a determination as to whether the surface of the road is abnormal can be made directly from the magnitude of the attenuation coefficient $\zeta$.

Figure 22:
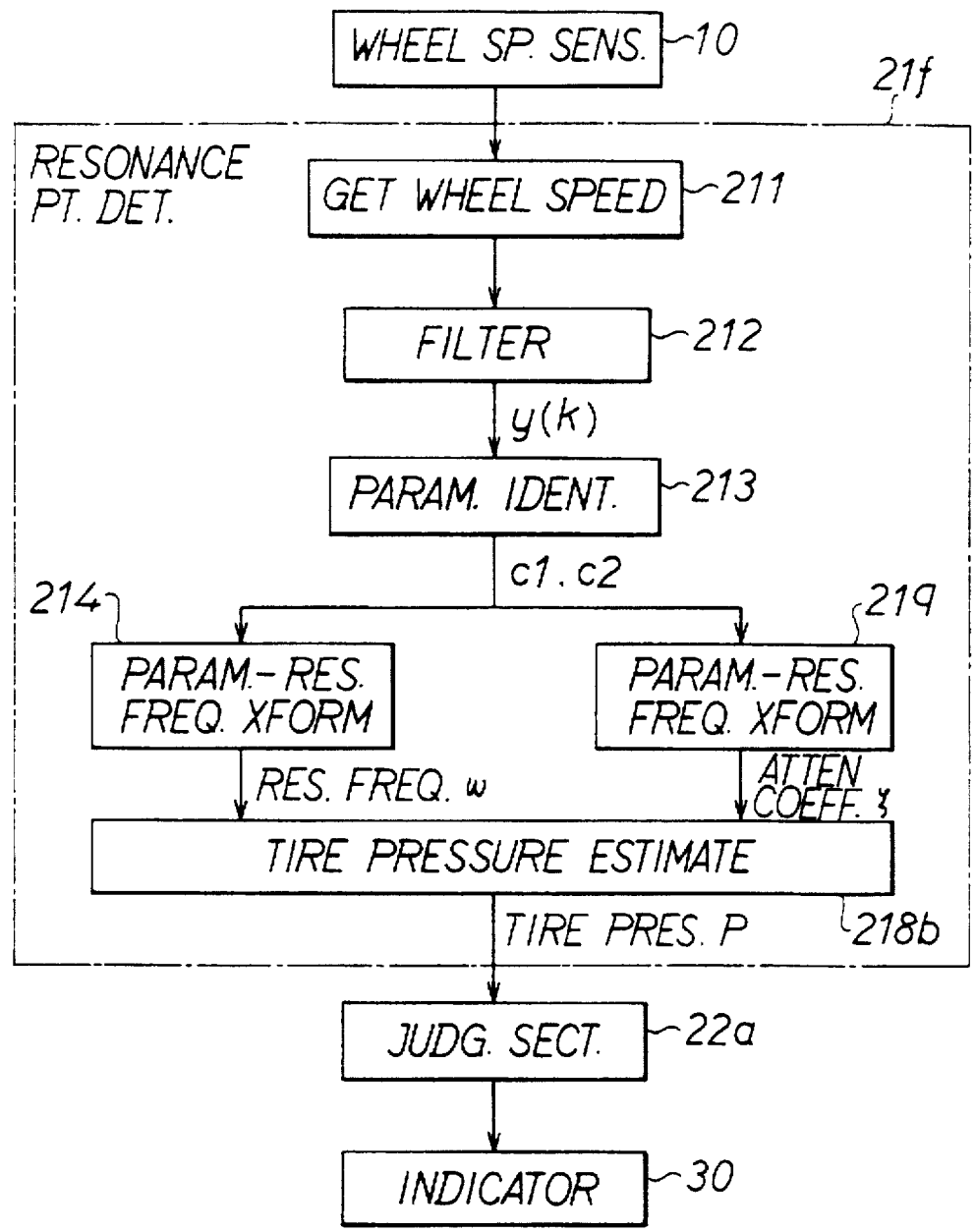
FIG. 22 is a block diagram showing a fifth embodiment implementing a tire pressure estimating system provided by the present invention.

The fifth embodiment implementing the tire pressure estimating system in accordance with the present invention is shown in FIG. 22. The fifth embodiment can determine whether the surface of a road is not normal by using the principle described above. In the case of an abnormal road surface, the estimation of the pressure p of a tire is halted. In this way, the tire pressure estimating system according to the fifth embodiment can maintain a high estimation accuracy.

The tire pressure estimating system according to the fifth embodiment shown in FIG. 22 is obtained by rearranging the tire pressure system of the first embodiment shown in FIGS. 1 to 6. As above, components identical to those in previous embodiments have the same reference numerals and are not described further herein.

A parameter/attenuation coefficient converter 219 employed in the resonance point detector 21f shown in FIG. 22 converts the parameter c2, which is output by the parameter identifying unit 213 every 20 seconds or so, into an attenuation coefficient $\zeta$ of the resonance component by executing processing in accordance with Equation 20. As shown in FIGS. 21A and 21B, the value of the attenuation coefficient $\zeta$ represents the magnitude of the resonance component as has been described previously. The attenuation coefficient $\zeta$ output by the parameter/attenuation coefficient converter 219 is supplied to a pressure estimating unit 218b along with the resonance frequency $\omega$ found by the parameter/resonance frequency converter 214.

Figure 23:
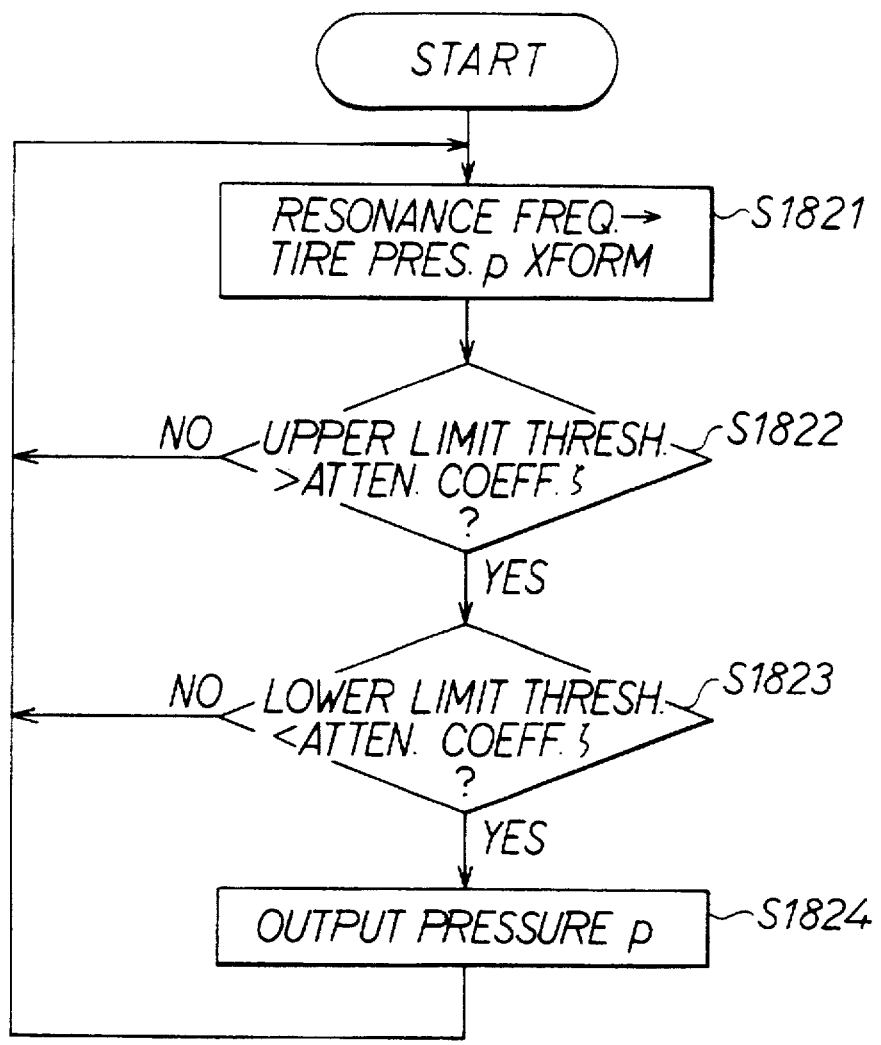
FIG. 23 shows a flowchart of a pressure identifying procedure according to the fifth embodiment.

The pressure estimating unit 218b converts the resonance frequency $\omega$ found by the parameter/resonance frequency converter 214 into a pressure p in accordance with a pressure estimating routine shown in FIG. 23 and, at the same time, determines whether the pressure p is to be supplied to the determination unit 22a depending upon the magnitude K of the road surface inputs.

First of all, at a step S1821 of the pressure estimating routine shown in FIG. 23, the pressure estimating unit 218b converts the resonance frequency $\omega$ found by the parameter/resonance frequency converter 214 into a pressure p by using a relationship shown in FIG. 8. Execution then proceeds to steps S1822 and S1823 to check the reliability of the value of the pressure p found at the step S1821 by examining the attenuation coefficient $\zeta$ found by the parameter/attenuation coefficient converter 219. That is, the attenuation coefficient $\zeta$ is examined to find out whether it is smaller than or equal to a predetermined upper threshold value but greater than or equal to a predetermined lower threshold value. Execution proceeds to a step S1824 to supply the value of the pressure p found by the pressure estimating unit 218b to the determination unit 22a only if the attenuation coefficient $\zeta$ is smaller than or equal to the predetermined upper threshold value at the step 1812 and greater than or equal to the predetermined lower threshold value at the step S1823. In other words, if the attenuation coefficient $\zeta$ is greater than the predetermined upper threshold value at the step S1822 or smaller than the predetermined lower threshold value at the step S1823, the outputting of the value of the pressure p found by the pressure estimating unit 218b to the determination unit 22a for this attenuation coefficient $\zeta$ is inhibited. For this reason, the upper and lower threshold values are typically determined in advance as follows.

The upper threshold value is a limit determined from the attenuation coefficient $\zeta$ obtained for a road with small amount of roughness and, thus, a poor S/N ratio, such as a snowy road.

The lower threshold value is a limit determined from the attenuation coefficient $\zeta$ obtained for a transient large road surface input caused by a bump or the like on the road.

By setting the upper and lower threshold values as described above, a value of the pressure p estimated from a bumpy or snowy road with a low degree of reliability that can cause deterioration of accuracy is excluded. Only a value of the pressure p which is estimated from a road of normal conditions with a high degree of reliability is supplied selectively to the determination unit 22a.

Much like the tire pressure estimating system according to the fourth embodiment described previously, also in the tire pressure estimating system according to the fifth embodiment, in the case of an abnormal road surface, the estimation of the pressure p of a tire is halted. In this way, the tire pressure estimating system according to the fifth embodiment can maintain high estimation accuracy.

In the case of the tire pressure estimating system according to the fourth embodiment, the condition of a road surface is determined by the magnitude K of road surface inputs. In the case of the tire pressure estimating system according to the fifth embodiment, on the other hand, the condition of a road surface is determined by the attenuation coefficient $\zeta$. It should be noted, however, that it is possible to implement another embodiment wherein both the magnitude K of road surface inputs and the attenuation coefficient $\zeta$ are used for determining the condition of a road surface.

More specifically, the configuration of the resonance point detector 21 includes both the road surface input estimating unit 217 and the parameter/attenuation coefficient converter 219. By using the magnitude K of road surface inputs and the attenuation coefficient $\zeta$, typically:

the pressure estimating unit 218 supplies the value of the pressure p found by the pressure estimating unit 218 to the determination unit 22a only if all conditions are satisfied at the steps S1812 and S1813 of FIG. 20 and the steps S1822 and S1823 of FIG. 23; that is, only if the magnitude K of the road surface inputs is smaller than or equal to the predetermined upper threshold value qt the step S1812 and greater than or equal to the predetermined lower threshold value at the step S1813 and the attenuation coefficient $\zeta$ is smaller than or equal to the predetermined upper threshold value at the step S1822 and greater than or equal to the predetermined lower threshold value at the step S1823; or by using a two-dimensional map prepared in advance for determining whether the surface of a road is abnormal with the magnitude K of road surface inputs and the attenuation coefficient $\zeta$ taken as parameters, the pressure estimating unit 218 finds from the two-dimensional map a value determined by the magnitude K of road surface inputs and the attenuation coefficient $\zeta$ and supplies the pressure p found by the pressure estimating unit 218 to the determination unit 22a only if the value found from the map indicates that the surface of the road is not abnormal.

By determining the surface of a road using the magnitude K of road surface inputs and the attenuation coefficient $\zeta$ as described above, that is, by adopting a configuration for evaluating the reliability of the estimated tire pressure p, the reliability can be checked more strictly, thus allowing the tire pressure estimating system to maintain a high estimation reliability.

In the tire pressure estimating systems according to the fourth and fifth embodiments, upper and lower threshold values are set at fixed values for use in the comparison with the magnitude K of road surface inputs and the attenuation coefficient $\zeta$ in determining whether the surface of a road is abnormal, that is, whether the tire pressure p is unreliable. Normally, however, the magnitude K of road surface inputs and the attenuation coefficient $\zeta$ vary to a certain degree from time to time depending upon the detected wheel speed signal y(k). To be more specific, when the rotational speed of the car wheel decreases, the magnitude K of road surface inputs also decreases but the attenuation coefficient $\zeta$ increases. Conversely, when the rotational speed of the car wheel increases, the magnitude K of road surface inputs also increases but the attenuation coefficient $\zeta$ decreases.

To cope with such a condition, it is possible to configure the pressure estimating unit 218 in such a way that the upper and lower threshold values for the magnitude K of road surface inputs and the attenuation coefficient $\zeta$ are shifted in accordance with a characteristic which depends on the detected wheel speed signal y(k) as described above. In such a configuration of the pressure estimating unit 218, the upper and lower threshold values for determining the condition of a road surface, that is, for evaluating the reliability of the estimated tire pressure p can be set at more appropriate numbers, allowing a more proper determination to be made. As a result, even higher accuracy of the estimation of the tire pressure p can be maintained.

It is also possible to implement a configuration wherein only the upper or lower threshold value is set. With such a configuration, at least, deterioration of the accuracy in the estimation of a tire pressure p due to road bumps existing on the surface of even an asphalt road or due to a poor S/N ratio for a road with a small amount of surface roughness such as a snowy road can be selectively avoided.

It is also possible to implement a configuration wherein the determination unit 22a issues a warning message stating: "The tire pressure can not be estimated!" to the display 30 when the pressure estimating unit 218 cannot output an estimated value of the pressure p to the determination unit 22a within a predetermined period of time or can not output it a predetermined number of times. A display function is executed to issue the warning message typically by making all the warning lamps 31FR, 31FL, 31RR and 31RL blinking or turning all of them on.

The tire pressure estimating systems according to the fourth and fifth embodiments are obtained by rearranging the tire pressure system of the first embodiment shown in FIGS. 1 to 6. The tire pressure estimating systems according to the fourth and fifth embodiments also have a variety of variations like the previous embodiments.

Figure 12:
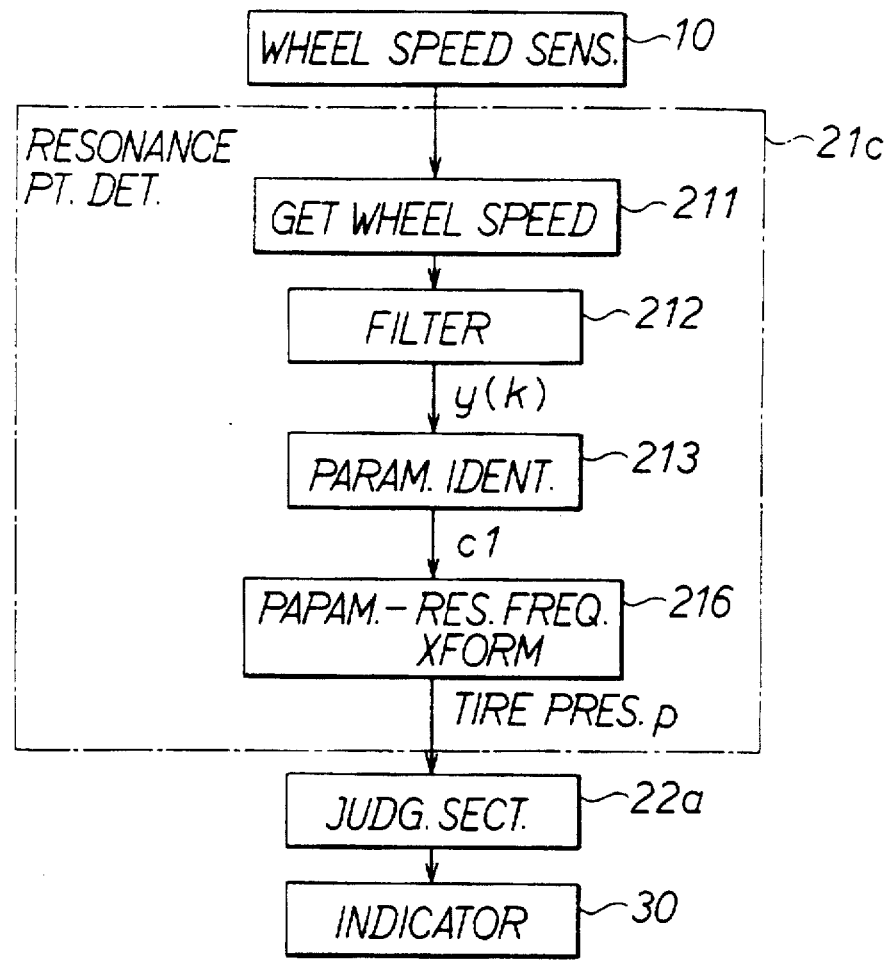
FIG. 12 is a block diagram showing still another typical configuration of the resonance point detector employed in the signal processor.

Such variations include the following. For example, it is possible to determine whether an abnormality of the tire pressure p exists directly from the resonance frequency $\omega$ as shown in FIG. 10. It is possible to estimate the pressure p of a tire directly from the parameter c1 as shown in FIG. 12. It is possible to determine whether an abnormality of the tire pressure p exists directly from the parameter c1 as shown in FIG. 14. It is possible to use the sequential least squares methods for identifying the parameters as shown in FIG. 15. Finally, a third-order model or higher-order model may be used as a linear prediction model as described in Equation 30.

In summary, the above-described variations of the fourth and fifth embodiments can have any configuration as long as the configuration allows only a value selected in accordance with the magnitude K of road surface inputs and/or the attenuation coefficient $\zeta$ to be supplied to the determination unit 22. By using a tire pressure estimating unit according to the fourth or fifth embodiment with such a configuration, it is possible to maintain high estimation accuracy.

The features offered by the tire pressure estimating systems according to the fourth and fifth embodiments can further be applied to the tire pressure estimating system according to the second embodiment shown in FIGS. 16 and 17 or to the tire pressure estimating system according to the third embodiment shown in FIG. 18.

That is, in the case of the tire pressure estimating system according to the second or third embodiment, only a value selected in accordance with the magnitude K of road surface inputs and/or the attenuation coefficient $\zeta$ is supplied to the determination unit 42 or 56 to maintain the estimation accuracy at a high level.

In the tire pressure estimating system according to any one of the first to fifth embodiments, the tire pressure is estimated and, if the pressure decreases to a value below a lower limit, a warning is issued. A tire pressure signal output by the signal processor 20 shown in FIG. 4 as indicated by a dashed arrow can be supplied to a brake control computer or a traction control computer as a signal representing the estimated pressure p of a tire. In this way, the tire pressure estimating system can be used as an auxiliary unit to the brake or traction control computer.

In the brake or traction control, the rotational speed of the vehicle wheels is converted into the velocity of the vehicle by multiplying the rotational speed by the radius of the wheel. When the pressure p of the tire of a vehicle wheel decreases, however, the radius of the tire also decreases, causing the calculated velocity to appear greater than the actual velocity. The incorrectly calculated velocity which appears greater than the actual velocity can be corrected by the pressure p of the tire in question. In this way, brake or traction control based on an incorrectly calculated velocity can be avoided.

The pressure p of a tire is much related to the friction coefficient of the surface of a road. For this reason, the pressure p of a tire can be used for correcting the friction coefficient or others.

As described above, according to the present invention, the amount of processing that needs to be carried out and the required memory capacity can be reduced substantially in comparison with the conventional tire pressure estimating system adopting the FFT method. As a result, the pressure p of a tire can be estimated from the rotational speed of the vehicle wheel of the tire.

In addition to the reduction of the amount of processing that needs to be carried out and the required memory capacity, according to the present invention, effects of correlation noise existing among a plurality of vehicle wheels can be eliminated, thus allowing the pressure p of a tire to be estimated with a high degree of accuracy.

According to the present invention, in the case of a road with a small amount of roughness such as a snowy road or even an asphalt road that has a bump on the surface thereof, that is, in the case of a road having an abnormal surface, the estimation of the pressure p of a tire is halted. In this way, the tire pressure estimating system according to the fourth embodiment can maintain a high estimation accuracy.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A tire pressure estimating system comprising:
   wheel speed detecting means for detecting a rotational speed of a vehicle wheel and for generating a signal representative thereof;
   estimating means for estimating a linear estimation model of tire vibration of said vehicle wheel, said linear estimation model including a resonance component related to tire pressure, based on said wheel rotational speed signal; and
   pressure determining means for determining at least one of said tire pressure and abnormality of said tire pressure based on said resonance frequency estimated by said linear estimation model.

2. A tire pressure estimating system according to claim 1, wherein:
   said linear estimation model is expressed by $$y(k)=-c1y(k-1)-c2y(k-2)-c3y(k-3)+d0m(k)+d1m(k-1)+d2m(k-2)$$

where k is a number of sampling operations, y(k) is said wheel rotational speed, m(k) is vibration input to said tire and c1, c2 ... and d0, d1 ... are parameters of said model; and said pressure estimating means includes parameter identifying means for identifying said parameters c1, c2 ... and d0, d1 ..., vibration component processing means for finding a vibration component of said wheel rotational speed from said parameters c1, c2 ... and d0, d1 ... identified by said parameter identifying means which is caused by said tire vibration, and pressure processing means for finding a pressure of said tire from said vibration component found by said vibration component processing means.

3. A tire pressure estimating system according to claim 1, wherein:
   said linear estimation model is expressed by $$y(k)=-c1y(k-1)-c2y(k-2)-c3y(k-3)+d0(m(k)+d1m(k-1)+d2m(k-2)$$

where k is the number of sampling operations, y(k) is said wheel rotational speed, m(k) is vibration input to said tire and c1, c2 ... and d0, d1 ... are parameters of said model; and said pressure estimating means includes parameter identifying means for identifying said parameters c1, c2 ... and d0, d1 ..., and pressure processing means for finding the pressure of said tire from said parameters c1, c2 ... and d0, d1 ... identified by said parameter identifying means.

4. A tire pressure estimating system according to claim 3, wherein said pressure processing means is for finding the pressure of said tire from one of said identified parameters c1, c2 ... and d0, d1 ... which does not change with a sampling attenuation coefficient.

5. A tire pressure estimating system according to claim 2, wherein said parameter identifying means is for identifying said parameters c1, c2 ... and d0, d1 ... using a batch least squares method.

6. A tire pressure estimating system according to claim 2, wherein said parameter identifying means is for identifying said parameters c1, c2 ... and d0, d1 ... by a recursive least squares method.

7. A tire pressure estimating system according to claim 2, wherein:
   said linear prediction model for said tire vibration is a second-order discrete-time model approximated by $$y(k)=-c1y(k-1)-c2y(k-2)+m(k) \quad (3)$$

and said parameter identifying means is for identifying parameters c1 and c2 in the above expression of said second-order discrete-time model.

8. A tire pressure estimating system comprising:
   wheel speed detecting means for detecting a rotational speeds of vehicle wheels;
   pressure estimating means for estimating a discrete-time model modeling distribution of vibration of said tires, including a resonance component related to tire pressure, said discrete-time model being expressed as one of a linear and a non-linear combination of a plurality of rotational speeds detected by said wheel speed detecting means; and pressure determining means for determining one of said tire pressure and abnormality of said tire based on said resonance frequency estimated by said discrete-time model.

9. A tire pressure estimating system according to claim 8, wherein said pressure estimating means is for implementing said one of said linear and non-linear combination of two drive vehicle wheels on right and left sides.

10. A tire pressure estimating system according to claim 9, wherein:

said discrete-time model is expressed by $$yR(k)-yL(k)=-cR1yR(k-1)-cR2yR(k-2)+mR(k)+cL1yL(k-1)+cL2yL(k-2)-mL(k)$$

where k is the number of sampling operations, yR(k) is a rotational speed of said drive vehicle wheel on a right side, yL(k) is a rotational speed of said drive vehicle wheel on a left side, mR(k) is vibration input to a tire on said drive vehicle wheel on the right side and mL(k) is vibration input to a tire on said drive vehicle wheel on the left side, cR1 and cR2 are parameters of said model associated with said drive vehicle wheel on the right side and cL1 and cL2 are parameters of said model associated with said drive vehicle wheel on the left side; and said pressure estimating means includes parameter identifying means for identifying said parameters cR1, cR2, cL1 and cL2, vibration component processing means for finding a vibration component of said wheel rotational speed from said parameters cR1, cR2, cL1 and cL2 identified by said parameter identifying means which is caused by said tire vibration, and pressure processing means for finding the pressure of said tire from said vibration component found by said vibration component processing means.

11. A tire pressure estimating system according to claim 9, wherein:

said discrete-time model is expressed by:

$$yR(k)-yL(k)=-cRF1yR(k-1)-cR2yR(k-2)+mR(k)+cL1yL(k-1)+cL2yL(k-2)-mL(k)$$

where k is the number of sampling operations, yR(k) is a rotational speed of said drive vehicle wheel on a right side, yL(k) is a rotational speed of said drive vehicle wheel on a left side, mR(k) is vibration input to a tire of said drive vehicle wheel on the right side and mL(k) is vibration input to a tire of said drive vehicle wheel on the left side, cR1 and cR2 are parameters of said model associated with said drive vehicle wheel on the right side and cL1 and cL2 are parameters of said model associated with said drive vehicle wheel on the left side; and said pressure estimating means includes parameter identifying means for identifying said parameters cR1, cR2, cL1 and cL2, and pressure processing means for finding the pressure of said tire from said parameters cR1, cR2, cL1 and cL2 identified by said parameter identifying means.

12. A tire pressure estimating system according to claim 11, wherein said pressure processing means is for finding the pressure of said tire from one of said identified parameters cR1, cR2, cL1 and cL2 which does not change with a sampling attenuation coefficient.

13. A tire pressure estimating system according to claim 10, wherein said parameter identifying means is for identifying said parameters cR1, cR2, cL1 and cL2 . . . by a batch least squares method.

14. A tire pressure estimating system according to claim 10, wherein said parameter identifying means is for identifying said parameters cR1, cR2, cL1 and cL2 . . . by a recursive least squares method.

15. A tire pressure estimating system according to claim 1, further comprising:

tire vibration input estimating means for estimating a magnitude of tire vibration inputs to be supplied to said wheel speed detecting means;

wherein said pressure estimating means is for evaluating reliability of an estimated pressure of said tire from said magnitude of said tire vibration inputs estimated by said tire vibration input estimating means and for discontinuing estimation of said pressure of said tire if a predetermined reliability is not obtained.

16. A tire pressure estimating system according to claim 15, wherein said pressure estimating means is for discontinuing estimation of the pressure of said tire if said magnitude of said tire vibration inputs estimated by said tire vibration input estimating means is greater than a predetermined value.

17. A tire pressure estimating system according to claim 15, wherein said pressure estimating means is for discontinuing estimation of the pressure of said tire if said magnitude of said tire vibration inputs estimated by said tire vibration input estimating means is smaller than a predetermined value.

18. A tire pressure estimating system according to claim 15, wherein said pressure estimating means is for discontinuing estimation of the pressure of said tire if said magnitude of said tire vibration inputs estimated by said tire vibration input estimating means is greater than a first predetermined value and is for discontinuing estimation of the pressure of said tire if said magnitude of said tire vibration inputs estimated by said tire vibration input estimating means is smaller than a second predetermined value.

19. A tire pressure estimating system according to claim 16, further comprising means for changing threshold values for said magnitude of said tire vibration inputs estimated by said tire vibration input estimating means in accordance with the rotational speed of said vehicle wheel detected by said wheel speed detecting means.

20. A tire pressure estimating system according to claim 15, wherein said tire vibration input estimating means is for estimating said magnitude of said tire vibration inputs by calculating a square root of a sum of squares of inputs supplied to said model adopted in said tire pressure estimating system.

21. A tire pressure estimating system according to claim 1, further comprising:

attenuation coefficient estimating means for estimating an attenuation coefficient of a vibration component to be supplied to said wheel speed detecting means; wherein said pressure estimating means is for evaluating reliability of an estimated pressure of said tire from said attenuation coefficient of said vibration component estimated by said attenuation coefficient estimating means and discontinues estimation of said pressure of said tire if a predetermined reliability is not obtained.

22. A tire pressure estimating system according to claim 21, wherein said pressure estimating means is for discontinuing estimation of the pressure of said tire if said attenuation coefficient of said vibration component estimated by said attenuation coefficient estimating means is greater than a predetermined value.

23. A tire pressure estimating system according to claim 21, wherein said pressure estimating means is for discontinuing estimation of the pressure of said tire if said attenuation coefficient of said vibration component estimated by said attenuation coefficient estimating means is smaller than a predetermined value.

24. A tire pressure estimating system according to claim 21, wherein said pressure estimating means is for discontinuing estimation of the pressure of said tire if said attenuation coefficient of said vibration component estimated by said attenuation coefficient estimating means is greater than a first predetermined value or if said attenuation coefficient and is for discontinuing estimation of the pressure of said tire if said vibration component estimated by said attenuation coefficient estimating means is smaller than a second predetermined value.

25. A tire pressure estimating system according to claim 22, further comprising means for changing threshold values for said attenuation coefficient of said vibration component estimated by said attenuation coefficient estimating means in accordance with the rotational speed of said vehicle wheel detected by said wheel speed detecting means.

26. A tire pressure estimating system according to claim 21, wherein said attenuation coefficient estimating means is for estimating said attenuation coefficient of said vibration component from parameters identified for said model adopted in said tire pressure estimating system.

27. A tire pressure estimating system comprising:
wheel speed detecting means for detecting a rotational speed of a vehicle wheel and for generating a signal representative thereof, said signal including a component of vibration input to be received by the vehicle wheel;
estimating means for estimating a parameter of a predetermined linear estimation model modeling frequency distribution of tire vibration, including a resonant component, in relation to tire pressure, based on said signal; and
pressure determining means for determining at least one of tire pressure and abnormality of said tire based on the parameter.

28. A tire pressure estimating system according to claim 27, wherein:
said linear estimation model is expressed by $$y(k)=-c1y(k-1)-c2y(k-2)-c3y(k-3)+d0m(k)+d1m(k-1)+d2m(k-2)$$

where k is a number of sampling operations, y(k) is said wheel rotational speed, m(k) is vibration input to said tire and c1, c2 ... and d0, d1 ... are said parameters; and
said pressure estimating means includes
parameter identifying means for identifying said parameters c1, c2 ... and d0, d1 ... ,
vibration component processing means for finding a vibration component of said wheel rotational speed from said parameters c1, c2 ... and d0, d1 ... identified by said parameter identifying means which is caused by said tire vibration, and
pressure processing means for finding a pressure of said tire from said vibration component found by said vibration component processing means.

29. A tire pressure estimating system according to claim 28, wherein said parameter identifying means is for identifying said parameters c1, c2 ... and d0, d1 ... using a batch least squares method.

30. A tire pressure estimating system according to claim 28, wherein said parameter identifying means is for identifying said parameters c1, c2 ... and d0, d1 ... by a sequential least squares method.

31. A tire pressure estimating system according to claim 28, wherein:
said linear estimation model for said tire vibration is a second-order discrete-time model approximated by $$y(k)=-c1y(k-1)-c2y(k-2)+m(k)$$

and
said parameter identifying means is for identifying parameters c1 and c2 in the above expression of said second-order discrete-time model.

32. A tire pressure estimating system according to claim 27, wherein:
said linear estimation model is expressed by $$y(k)=-c1y(k-1)-c2y(k-2)-c3y(k-3)+d0(m(k)+d1m(k-1)+d2m(k-2)$$

where k is the number of sampling operations, y(k) is said wheel rotational speed, m(k) is vibration input to said tire and c1, c2 ... and d0, d1 ... are said parameters; and
said pressure estimating means includes
parameter identifying means for identifying said parameters c1, c2 ... and d0, d1 ... , and
pressure processing means for finding the pressure of said tire from said parameters c1, c2 ... and d0, d1 ... identified by said parameter identifying means.

33. A tire pressure estimating system according to claim 32, wherein said pressure processing means is for finding the pressure of said tire from one of said identified parameters c1, c2 ... and d0, d1 ... which does not change with a sampling attenuation coefficient.

34. A tire pressure estimating system according to claim 27, further comprising:
tire vibration input estimating means for estimating a magnitude of tire vibration inputs to be supplied to said wheel speed detecting means;
wherein said pressure estimating means is for evaluating reliability of an estimated pressure of said tire from said magnitude of said tire vibration inputs estimated by said tire vibration input estimating means and for discontinuing estimation of said pressure of said tire if a predetermined reliability is not obtained.

35. A tire pressure estimating system according to claim 34, wherein said pressure estimating means is for discontinuing estimation of the pressure of said tire if said magnitude of said tire vibration inputs estimated by said tire vibration input estimating means is greater than a predetermined value.

36. A tire pressure estimating system according to claim 35, further comprising means for changing threshold values for said magnitude of said tire vibration inputs estimated by said tire vibration input estimating means in accordance with the rotational speed of said vehicle wheel detected by said wheel speed detecting means.

37. A tire pressure estimating system according to claim 34, wherein said pressure estimating means is for discontinuing estimation of the pressure of said tire if said magnitude of said tire vibration inputs estimated by said tire vibration input estimating means is smaller than a predetermined value.

38. A tire pressure estimating system according to claim 34, wherein said pressure estimating means is for discontinuing estimation of the pressure of said tire if said magnitude of said tire vibration inputs estimated by said tire vibration input estimating means is greater than a first predetermined value and is for discontinuing estimation of the pressure of said tire if said magnitude of said tire vibration inputs estimated by said tire vibration input estimating means is smaller than a second predetermined value.

39. A tire pressure estimating system according to claim 34, wherein said tire vibration input estimating means is for estimating said magnitude of said tire vibration inputs by calculating a square root of a sum of squares of inputs supplied to said model adopted in said tire pressure estimating system.

40. A tire pressure estimating system according to claim 27, further comprising:
attenuation coefficient estimating means for estimating an attenuation coefficient of a vibration component to be supplied to said wheel speed detecting means; wherein said pressure estimating means is for evaluating reliability of an estimated pressure of said tire from said attenuation coefficient of said vibration component estimated by said attenuation coefficient estimating means and discontinues estimation of said pressure of said tire if a predetermined reliability is not obtained.

41. A tire pressure estimating system according to claim 40, wherein said pressure estimating means is for discontinuing estimation of the pressure of said tire if said attenuation coefficient of said vibration component estimated by said attenuation coefficient estimating means is greater than a predetermined value.

42. A tire pressure estimating system according to claim 41, further comprising means for changing threshold values for said attenuation coefficient of said vibration component estimated by said attenuation coefficient estimating means in accordance with the rotational speed of said vehicle wheel detected by said wheel speed detecting means.

43. A tire pressure estimating system according to claim 40, wherein said pressure estimating means is for discontinuing estimation of the pressure of said tire if said attenuation coefficient of said vibration component estimated by said attenuation coefficient estimating means is smaller than a predetermined value.

44. A tire pressure estimating system according to claim 40, wherein said pressure estimating means is for discontinuing estimation of the pressure of said tire if said attenuation coefficient of said vibration component estimated by said attenuation coefficient estimating means is greater than a first predetermined value or if said attenuation coefficient and is for discontinuing estimation of the pressure of said tire if said vibration component estimated by said attenuation coefficient estimating means is smaller than a second predetermined value.

45. A tire pressure estimating system according to claim 40, wherein said attenuation coefficient estimating means is for estimating said attenuation coefficient of said vibration component from parameters identified for said model adopted in said tire pressure estimating system.

46. A tire pressure estimating system comprising:
wheel speed detecting means for detecting a rotational speeds of vehicle wheels;
estimating means for estimating a parameter of a discrete-time model modeling a frequency distribution of vibration of said tires, including a resonance component related to tire pressure, said discrete-time model being expressed as one of a linear and a non-linear combination of a plurality of rotational speeds detected by said wheel speed detecting means; and
pressure determining means for determining at least one of said tire pressure and abnormality of said tire based on said estimated parameter.

47. A tire pressure estimating system according to claim 46, wherein said pressure estimating means is for implementing said one of said linear and non-linear combination of two drive vehicle wheels on right and left sides.

48. A tire pressure estimating system according to claim 47, wherein:
said discrete-time model is expressed by $$yR(k)-yL(k)=-cR1yR(k-1)-cR2yR(k-2)+mR(k)+cL1yL(k-1)+cL2yL(k-2)-mL(k)$$

where k is the number of sampling operations, yR(k) is a rotational speed of said drive vehicle wheel on a right side, yL(k) is a rotational speed of said drive vehicle wheel on a left side, mR(k) is vibration input to a tire on said drive vehicle wheel on the right side and mL(k) is vibration input to a tire on said drive vehicle wheel on the left side, cR1 and cR2 are said parameters associated with said drive vehicle wheel on the right side and cL1 and cL2 are said parameters associated with said drive vehicle wheel on the left side; and said pressure estimating means includes parameter identifying means for identifying said parameters cR1, cR2, cL1 and cL2, vibration component processing means for finding a vibration component of said wheel rotational speed from said parameters cR1, cR2, cL1 and cL2 identified by said parameter identifying means which is caused by said tire vibration, and pressure processing means for finding the pressure of said tire from said vibration component found by said vibration component processing means.

49. A tire pressure estimating system according to claim 48, wherein said parameter identifying means is for identifying said parameters cR1, cR2, cL2 and cL2 ... by a batch least squares method.

50. A tire pressure estimating system according to claim 48, wherein said parameter identifying means is for identifying said parameters cR1, cR2, cL1 and cL2 ... by a sequential least squares method.

51. A tire pressure estimating system according to claim 47, wherein:
said discrete-time model is expressed by:

$$yR(k)-yL(k)=-cRF1yR(k-1)-cR2yR(k-2)+mR(k)+cL1yL(k-1)+cL2yL(k-2)-mL(k)$$

where k is the number of sampling operations, yR(k) is a rotational speed of said drive vehicle wheel on a right side, yL(k) is a rotational speed of said drive vehicle wheel on a left side, mR(k) is vibration input to a tire of said drive vehicle wheel on the right side and mL(k) is vibration input to a tire of said drive vehicle wheel on the left side, cR1 and cR2 are said parameters associated with said drive vehicle wheel on the right side and cL1 and cL2 are said parameters associated with said drive vehicle wheel on the left side; and said pressure estimating means includes parameter identifying means for identifying said parameters cR1, cR2, cL1 and cL2, and pressure processing means for finding the pressure of said tire from said parameters cR1, cR2, cL1 and cL2 identified by said parameter identifying means.

52. A tire pressure estimating system according to claim 51, wherein said pressure processing means is for finding the pressure of said tire from one of said identified parameters cR1, cR2, cL1 and cL2 which does not change with a sampling attenuation coefficient.

53. A tire pressure estimating system comprising:

wheel speed detecting means for detecting a rotational speed of a vehicle wheel including a component of vibration provided to a tire of said wheel and for generating a signal representative thereof;

calculating means for calculating a linear estimation model representative of a frequency distribution of tire vibration of said tire, said distribution including a resonance component related to tire pressure of said tire, based on said rotational speed signal; and pressure determining means for at least one of determining abnormality of said tire pressure and estimating said tire pressure based on the resonance frequency which is decided by said linear estimation model.

54. A tire pressure estimating system comprising:

wheel speed estimating means for detecting a rotational speed of a vehicle wheel including a component of vibration provided to a tire of said wheel and for generating a signal representative thereof;

calculating means for calculating a discrete-time model representative of a frequency distribution of tire vibration of said tire, said distribution including a resonance component related to tire pressure, said discrete-time model being expressed as one of a linear combination and a non-linear combination of a plurality of rotational speed signals detected by said wheel speed detecting means; and pressure determining means for determining abnormality of said tire pressure or estimating said tire pressure based on the resonance frequency which is decided by said linear estimation model.

55. A tire pressure estimating system comprising:

wheel speed estimating means for detecting a rotational speed of a vehicle wheel including a component of vibration provided to a tire of said wheel and for generating a signal representative thereof;

calculating means for calculating a parameter of a linear estimation model representative of a frequency distribution of tire vibration of said tire, said distribution including a resonance component related to tire pressure of said tire, based on said rotational speed signal; and pressure determining means for at least one of determining abnormality of said tire pressure and estimating said tire pressure based on the parameter calculated by said calculating means.

56. A tire pressure estimating system comprising:

wheel speed estimating means for detecting a rotational speed of a vehicle wheel including a component of vibration provided to a tire of said wheel and for generating a signal representative thereof;

calculating means for calculating a parameter of a discrete-time model representative of a frequency distribution of tire vibration of said tire, said distribution including a resonance component related to tire pressure of said tire, said discrete-time model being expressed as one of a linear and a non-linear combination of a plurality of rotational speed signals detected by said wheel speed detecting means; and pressure determining means for at least one of determining abnormality of said tire pressure and estimating said tire pressure based on the parameter calculated by said calculating means.

57. A tire pressure estimating system comprising:

wheel speed estimating means for detecting a rotational speed of a vehicle wheel including a component of vibration provided to a tire of said wheel and for generating a signal representative thereof;

calculating means for calculating a predetermined mathematical expression model representative of tire vibration of said tire using a linear estimation method and said signal of said wheel speed detecting means;

estimating means for estimating a resonance frequency of said tire based on the calculated mathematical expression model; and pressure determining means for determining abnormality of said tire pressure or estimating said tire pressure based on the resonance frequency which is estimated by estimating means.

58. A tire pressure estimating system comprising:

wheel speed estimating means for detecting a rotational speed of a vehicle wheel including a component of vibration provided to a tire of said wheel and for generating a signal representative thereof;

calculating means for calculating a predetermined mathematical expression model representative of tire vibration of said tire using a discrete-time method and one of a linear and non-linear combination of a plurality of rotational speed signal detected by said wheel speed detecting means;

estimating means for estimating a resonance frequency of said tire based on the calculated mathematical expression model; and pressure determining means for determining abnormality of said tire pressure or estimating said tire pressure based on the resonance frequency which is estimated by estimating means.

59. A tire pressure estimating system comprising:

wheel speed estimating means for detecting a rotational speed of a vehicle wheel including a component of vibration provided to a tire of said wheel and for generating a signal representative thereof;

calculating means for calculating a parameter of a predetermined mathematical expression model representative of tire vibration of said tire using a linear estimation method and the output signal of said wheel speed detecting means;

estimating means for estimating a resonance frequency of said tire based on the calculated parameter; and pressure determining means for determining abnormality of said tire pressure or estimating said tire pressure based on the parameter which is estimated by estimating means.

60. A tire pressure estimating system comprising:

wheel speed estimating means for detecting a rotational speed of a vehicle wheel including a component of vibration provided to a tire of said wheel and for generating a signal representative thereof;

calculating means for calculating a parameter of a predetermined mathematical expression model representative of tire vibration of said tire using a discrete-time method and one of a linear and non-linear combination of plurality of rotational speed signal detected by said wheel speed detecting means;

estimating means for estimating a resonance frequency of said tire based on the calculated parameter; and pressure determining means for determining abnormality of said tire pressure or estimating said tire pressure based on the parameter which is estimated by estimating means.

61. A tire pressure estimating system according to claim 53, wherein:

said linear estimation model is expressed by a mathematical expression model which has factors including a number of sampling operations, wheel rotational speed, vibration input to said tire;

said linear estimation model uses, for each of said factors, a plurality of sampled values of said factor; and each of said sampled values has a parameter of said model associated therewith.

62. A tire pressure estimating system according to claim 54, wherein:

said discrete-time model is expressed by a second-order approximation mathematical model which has a number of sampling operations factor, wheel rotational speed factor, vibration input to said tire factor;

said linear estimation model uses, for each of said factors, a plurality of sampled values of said factor; and each of said sampled values has a parameter of said model associated therewith.

63. A tire pressure estimating system according to claim 55, wherein said parameter is a parameter of said model associated with one of a number of sampling operations, wheel rotational speed, and vibration input to said tire.

64. A tire pressure estimating system according to claim 56, wherein said parameter is a parameter of said model associated with one of a number of sampling operations, wheel rotational speed, and vibration input to said tire.

* * * * *